(12) United States Patent
Fleck

(10) Patent No.: US 10,690,542 B2
(45) Date of Patent: *Jun. 23, 2020

(54) DEVICE AND METHOD OF MEASURING ABSORBED ENERGY-MOMENTUM SYMMETRY

(71) Applicant: Steve W. Fleck, Dunwoody, GA (US)

(72) Inventor: Steve W. Fleck, Dunwoody, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/011,022

(22) Filed: Jun. 18, 2018

(65) Prior Publication Data

US 2019/0094071 A1    Mar. 28, 2019

Related U.S. Application Data

(63) Continuation of application No. 14/865,193, filed on Sep. 25, 2015, now Pat. No. 10,001,408.

(51) Int. Cl.
*G01J 1/42* (2006.01)
*G01J 1/04* (2006.01)
*G01J 1/02* (2006.01)
*G01P 3/36* (2006.01)

(52) U.S. Cl.
CPC .......... *G01J 1/4257* (2013.01); *G01J 1/0252* (2013.01); *G01J 1/0403* (2013.01); *G01J 1/044* (2013.01); *G01J 1/0411* (2013.01); *G01J 1/0414* (2013.01); *G01J 1/0422* (2013.01); *G01P 3/36* (2013.01)

(58) Field of Classification Search
CPC ...... G01J 1/0252; G01J 1/0403; G01J 1/0411; G01J 1/0422; G01J 1/4257; G01P 3/36
USPC ....................................... 250/214.1
See application file for complete search history.

(56) References Cited

U.S. PATENT DOCUMENTS 4,052,129 A * 10/1977 Schawlow ............ G01J 9/0246
356/451

* cited by examiner

*Primary Examiner* — Que Tan Le
(74) *Attorney, Agent, or Firm* — Meunier Carlin & Curfman LLC

(57) ABSTRACT

A method and a device for measuring absorbed energy-momentum symmetry in which radiant energy $W \cdot sr^{-1} \cdot m^{-2} \cdot nm^{-1}$ is compared directly against its absorbed impinging momentum $kg \cdot m \cdot s-1$ in a manner that will provide an experimental basis for asymmetrical anomalies that may or may not exist within a measurable range of the electromagnetic spectrum.

10 Claims, 17 Drawing Sheets

Note: Planck's Law may also be expressed as a function of frequency (v) Ev

FIG. 5
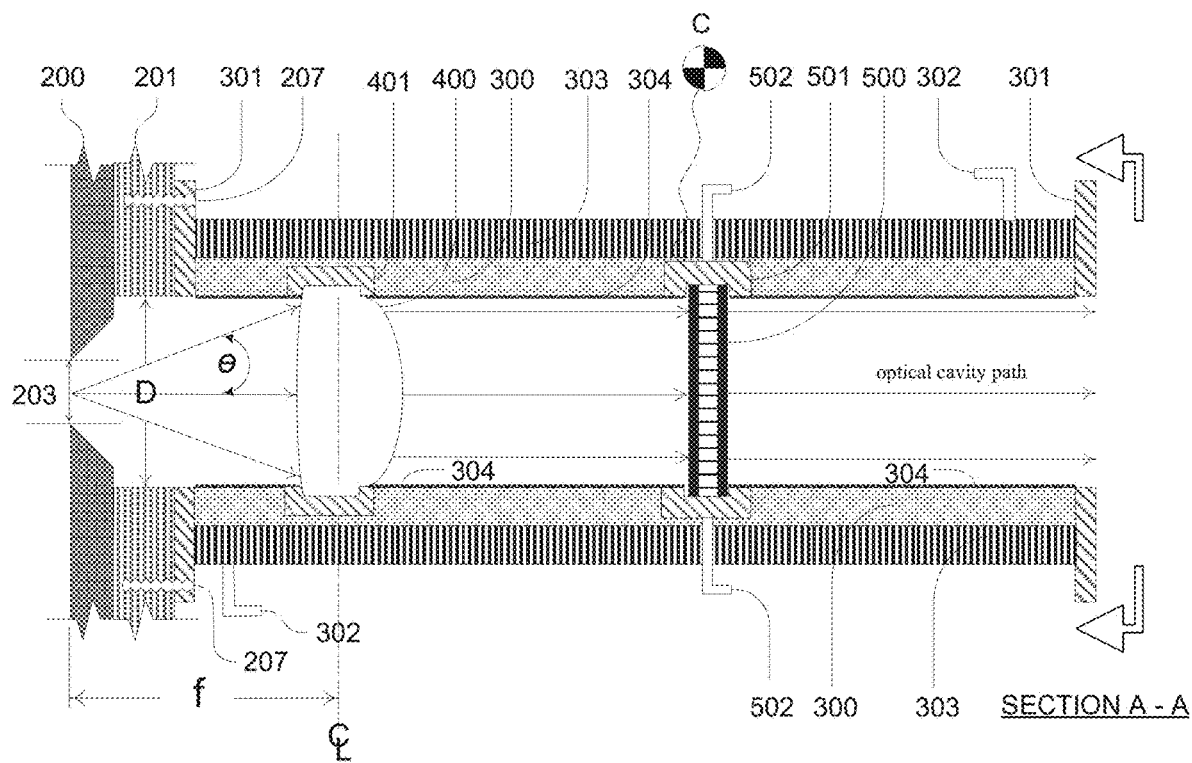
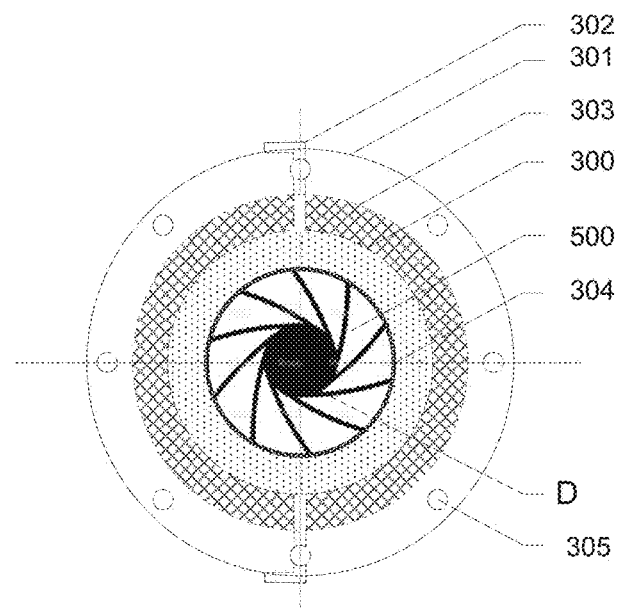
SECTION A - A

*Page 1 of 7*

*FIG. 10A*

The following table of major invention device numbered components shall be equal or superior to listed manufacturer components.

| No. | FIG. No. | General Description | Manufacturer | Mfg. Item | Web URL |
|---|---|---|---|---|---|
| 100 | 6 | Ultra high temp blackbody calibrator | LumaSense Technologies, Inc. 3301 Leonard Court Santa Clara, CA 95054 | Calibration source M390C-2 | http://www.lumasenseinc.com |
| 200 | 6 | Aperture wheel and energy stop | LumaSense Technologies, Inc. 3301 Leonard Court Santa Clara, CA 95054 | water-cooled wheel assembly: 14002-1 14002 | http://www.lumasenseinc.com Note: See Calibration Sources Overview Brochure |
| 204 | 6 | Friction wheel | Industrial Friction Materials Unit 7, East Moors Bus. Park, East Moors Rd, Cardiff, South Glamorgan, CF24 5JX | Customized friction gear sized to accurately rotate aperture wheel 200 | http://www.industrialfriction.com |
| 206 | 6 | Stepper or servo motor | AutomationDirect 3505 Hutchinson Road Cumming, GA 30040 | Precision stepper or servo motion control motors | http://www.automationdirect.com |
| 300 301 303 | 7 | Custom Vacuum Tight Optical Conduit | CeramTec Corp North America One Technology Place Laurens, SC 29360 | Vacuum-tight optical Ceramaseal components. | http://www.ceramtec.us |

*Page 2 of 7*

FIG. 10B

| 304 | 7 | Carbon nanotube or equivalent coatings for highly efficient absorption of incident radiant energy | Surrey NanoSystems Unit 24 Euro Business Park New Road Newhaven BN9 0DQ, UK | Vantablack electromagnetic absorbing materials | www.surreynanosystems.com |
| --- | --- | --- | --- | --- | --- |
| 400 | 7 | CVD Diamond Collimator Lens | Element Six 35 West 45th St., New York, NY 10036, USA | CVD Diamond Optics | http://www.e6.com/wps/wcm/connect/E6_Content_EN/Home/Applications/Optics/ |
|  |  |  | II-VI INFRARED 375 Saxonburg Blvd Saxonburg, PA 16056 | CVD Collimating Optics | http://www.iiviinfrared.com/CO2-Laser-Optics/collimating-optics.html |
| 500 | 7 | High intensity heat-load shutters | FMB Oxford Ltd. Head Office Unit 1 Ferry Mills Osney Mead Oxford OX2 0ES United Kingdom | Bremsstrahlung Safety Shutter integrated with a photon shutter | http://www.fmb-oxford.com |

FIG. 10C

Page 3 of 7

| | | | | |
|---|---|---|---|---|
| 600 | 8 | Beamsplitter | Optometrics Corporation<br>119 Russell Street, Suite 10<br>Littleton, MA 01460-1274 | diamond beam splitter, polka dot beam splitters, and nitrogen cooled beam splitters | http://www.optometrics.com/ |
| | | | Element Six<br>35 West 45th St., New York, NY 10036, USA | | http://www.e6.com |
| | | | Thermo Electron Spectroscopy<br>5225 Verona Road Madison, WI 53711-4495 | | www.thermonicolet.com |
| 700<br>701<br>703 | 8 | Custom Vacuum Tight Optical Conduit | CeramTec Corp North America<br>One Technology Place Laurens, SC 29360 | Vacuum-tight optical Ceramaseal components. | http://www.ceramtec.us |
| 704 | 8 | Carbon nanotube or equivalent coatings for highly efficient absorption of incident radiant energy | Surrey NanoSystems<br>Unit 24 Euro Business Park<br>New Road<br>Newhaven BN9 0DQ, UK | Vantablack electromagnetic absorbing materials | www.surreynanosystems.com |

FIG. 10D

Page 4 of 7

| | | | | |
|---|---|---|---|---|
| 800 810 | 8 | Monochromator | Physical Sciences Laboratory University of Wisconsin-Madison 3725 Schneider Dr. Stoughton, WI 53589 | SGM-EI is a water cooled grating chamber monochromator | http://www.psl.wisc.edu/products/grating-monochromators/previous/sgm-ei |
| | | | Horiba Scientific 3880 Park Avenue Edison, NJ 08820 | Research grade scanning monochromator systems | http://www.horiba.com/us/en/scientific/products/monochromators/?gclid=ClvVis_r8cICFQET7AodhzcANg |
| 900 901 903 | 9 | Custom Vacuum Tight Optical Conduit for Equal-Arm Force Comparator Components | CeramTec Corp North America One Technology Place Laurens, SC 29360 | Vacuum-tight optical Ceramaseal components. | http://www.ceramtec.us |
| 904 | 9 | Carbon nanotube or equivalent coatings for highly efficient absorption of incident radiant energy | Surrey NanoSystems Unit 24 Euro Business Park New Road Newhaven BN9 0DQ. UK | Vantablack electromagnetic absorbing materials | www.surreynanosystems.com |
| 905 | 9 | Electron beam absorbing coating | Strem Chemicals, Inc. 7 Mulliken Way Newburyport, MA 01950-4098 USA | Gold Nanotriangles, Nanohexagons, Nanopolygons and Nanorods (AuNP) Coatings | http://www.strem.com/ |
| 1000 1010 | 9 | Beam steering wedge prisms | OPTRA, Inc. 461 Boston Street, Topsfield MA 01983-1234 | Clear Aperture Compact Beam Steering Systems | http://www.optra.com/ |

FIG. 10E

Page 5 of 7

| 1100 1110 | 9 | CVD Diamond Collimator Lens | Element Six 35 West 45th St., New York, NY 10036, USA | CVD Diamond Optics | http://www.e6.com/wps/wcm/connect/E6_Content_EN/Home/Applications/Optics/ |
| | | | II-VI INFRARED 375 Saxonburg Blvd Saxonburg, PA 16056 | CVD Collimating Optics | http://www.iivinfrared.com/CO2-Laser-Optics/collimating-optics.html |
| 1200 1210 | 9 | Positioning mirrors | Praezisions Glas & Optik GmbH Im Langen Busch 14 D-58640 Iserlohn Germany | High reflection mirrors for high temperature environments | http://www.pgo-online.com/ |
| 1300 1310 | 9 | Ultra-high Intensity spectral radiant power meter | Mikron Infrared Inc 16 Thornton Road Oakland NJ 07436 | Heat Flux Meters designed for direct and unambiguous calibration of heat flux meters up to 200KW/m2 | http://www.transcat.com/media/pdf/blackbody.pdf |
| 1400 1410 | 9 | CVD Diamond Focusing Lens | Element Six 35 West 45th St., New York, NY 10036, USA | CVD Diamond Optics | http://www.e6.com/ |
| | | | II-VI INFRARED 375 Saxonburg Blvd Saxonburg, PA 16056 | | http://www.iivinfrared.com/ |

FIG. 10F

| | | | | |
|---|---|---|---|---|
| 1500 1510 | 9 | Optical chopper | Sutter Instrument One Digital Drive Novato, CA 94949, USA | Vacuum compatible stepper-motor driven electromagnetic choppers, water or nitrogen cooled if necessary | http://www.sutter.com/ |
| | | | McPherson, Inc. 7A Stuart Road, Chelmsford, MA 01824 | | http://www.mcphersoninc.com/accessories/vacaccy.htm |
| 1600 1601 | 9 | Thin film solar materials | Materion Advanced Material Group 2978 Main Street Buffalo, NY 14214 | High performance functionally engineered thin film solar materials | http://www.materion.com/ |
| 1602 1603 1606 1627A 1627B | 9 | Materials having the lowest practical mass and highest practical Young's modulus, or stiffness practical | Materion Advanced Material Group 2978 Main Street Buffalo, NY 14214 | Functionally engineered nanocomposite materials | http://www.materion.com/ |
| 1604A 1604B | 9 | Ultra-light magnetic materials | Institut de Ciència de Materials de Barcelona Campus de la UAB 08193 Bellaterra, Spain, 08193 Bellaterra, Barcelona, Spain | Ultra-light magnetic materials manufactured of silica aerogel combined with extremely fine magnetic particles composed of neodymium, iron and boron. | http://icmab.es/ |
| 1605 | | | | | |

FIG. 10G

Page 7 of 7

| | | | | |
|---|---|---|---|---|
| 1608A 1608B 1609 1610 | 9 | MEMS frictionless bearing material. | Advanced Diamond Technologies, Inc. 48 East Belmont Drive, Romeoville, IL 60446 | Advanced Diamond Technologies (ADT) Application Development of MEMS frictionless bearing materials. | http://www.thindiamond.com/ |
| 1627A 1627B | | Engineered thin film materials | Materion Advanced Material Group 2978 Main Street Buffalo, NY 14214 | Thin film composites for substrate material | http://materion.com/ |
| 1700 | 5 | Input/Output (I/O) Modules | Rockwell Automation Headquarters (Allen-Bradely) 1201 S 2nd St, Milwaukee, WI 53204 | I/O modules for sensors and actuators shown as items A through N in FIG. 5 | http://ab.rockwellautomation.com |
| 1800 | 5 | Programmable logic controller (PLC) | Rockwell Automation Headquarters (Allen-Bradely) 1201 S 2nd St, Milwaukee, WI 53204 | Information-enabled programmable automation controller (PAC) | http://ab.rockwellautomation.com |
| 1900 | 5 | Vibration isolation table | TMC Ametek 15 Centennial Drive Peabody, MA 01960 | Integrated Active Piezoelectric Vibration Cancellation similar to STACIS® iX LaserTable-Base | http://www.techmfg.com/ |

FIG. 11

Optical lenses used by the invention device shall be better than or equal to the following specifications:

| | | |
|---|---|---|
| Hardness | 9,000 to 10,000 | kgf/cm$^2$ |
| Young's Module | 1,200 | GPa |
| Coefficient of Friction | 0.1 | |
| Coefficient of thermal Expansion | 0.8 | $10^{-6}/°C$ |
| Thermal Conductivity | 10 to 20 | 300k, w/cm.k |
| Longitudinal Wave Velocity of Sound | 18,000 | m/s |
| Density | 2.8 to 3.5 | g/cm$^3$ |
| Refractive Index | 2.4 | 590 nm |
| Width of Band Gap | 5.5 | eV |
| Light Transmission | 225nm to far-IR | |
| Resistivity | >1010 | Ω.cm |
| Dielectric Strength | >1018 | v/cm |
| Electron Mobility | 4500 | cm$^2$/v.s |
| Hole Mobility | 2300 | cm$^2$/v.s |
| Dielectric Constant | 5.5 | 5.5 |
| Saturated Electron Velocity | 2.7X10$^7$ | cm/s |
| Melting Point | 3,500 | °C |
| Boiling Point | 4,200 | °C |

DEVICE AND METHOD OF MEASURING ABSORBED ENERGY-MOMENTUM SYMMETRY

RELATED APPLICATION

This application is a continuation application of U.S. patent application Ser. No. 14/865,193, filed Sep. 25, 2015, which is hereby incorporated by reference in its entirety.

TECHNICAL FIELD OF INVENTION

The present invention relates to radiometers or other devices that can detect radiant power of electromagnetic energy and the momentum it imparts upon impinging matter. More particularly, the present invention relates to a device and method by which to measure absorbed energy-momentum symmetry.

BACKGROUND OF INVENTION

The concept of symmetry and how it dominates modern fundamental physics, both in quantum theory and in relativity is described by Katherine Brading and Elena Castellani in an article entitled "Symmetry and Symmetry Breaking", The Stanford Encyclopedia of Philosophy (Spring 2013 Edition), Edward N. Zalta (ed.). Symmetry breaking or quantum-mechanical effects known as anomalies have acquired special significance in physics. In a situation characterized by an absolute symmetry, nothing definite could exist since absolute symmetry means total lack of differentiation. One of the first explicit studies of symmetry breaking with respect to physical objects and phenomena, especially electric and magnetic, was conducted by Pierre Curie at the end of the nineteenth century. One of Curie's conclusions is that symmetry can coexist with certain phenomena, but they are not necessary. What is necessary is that certain elements of symmetry do not exist. Dissymmetry or asymmetry is what creates the phenomenon. The 2008 Nobel Prize in Physics was awarded to Kobayashi and Maskawa for discoveries concerning symmetry violation in the field of particle physics. A growing number of theoretical physicists, notably Lee Smolin and Marcelo Gleiser, infer that a relational complete theory of the physical universe must have mechanisms that drive the universe away from symmetry and equilibrium and when the laws of nature are expressed in terms of fundamental entities there can be no symmetries. The symmetrical relationship of radiant energy to its impinging momentum was first deduced by Maxwell and later experimentally proven by Lebedev, Nichols and Hull. It is the propose of the invention to measure absorbed energy-momentum symmetry in a manner that will provide an experimental basis for asymmetrical anomalies that may or may not exist within a measurable range of the electromagnetic spectrum.

Prior-art devices measure radiant energy or radiant momentum, but not absorbed energy-momentum symmetry [as herein described by the present invention.] The present inventor generally defines absorbed energy-momentum symmetry as the comparison of radiant energy in units of $W \cdot sr^{-1} \cdot m^{-2} \cdot nm^{-1}$ directly against the momentum this energy imparts when impinging an equal-arm force comparator device, described in detail within FIG. 9, at the same angle of incidence and same instant and duration of time, measured in units of kg·m·s−1. Measurement of radiant energy occurs when a sensor transforms nonelectrical photonic stimulation to an electrical response that is suitable to be processed by electrical circuits. Prior art sensors transform the physical effects of impinging radiant energy into electric signals suitable to be processed by electrical circuits. These effects include but are not limited to piezoresistive effect, thermoelectric effect, piezoelectric effect, pyroelectric effect, photoelectric effect, temperature effect in p-n junction, and Hall effect. Further, and more particularly, the present inventor defines the terms "energy", "absorb", "momentum" and "symmetry" as follows:

Energy or radiant energy as used herein is more specifically the spectral radiance of electromagnetic energy from a blackbody radiation source as defined by Planck's radiation law, measured in units of $W \cdot sr^{-1} \cdot m^{-2} \cdot nm^{-1}$ where W is Watts, $sr^{-1}$ is steradian, $m^{-2}$ is square meter and nm is the monochromatic wavelength in nanometers. Radiant energy, including high frequency or low wavelength ionizing radiant energy, is normally measured using prior art sensors as previously described.

Absorb as used herein is defined as a materials ability to absorb impinging radiant energy as a function of Einstein's photoelectric effect defined as $E=h\nu-\emptyset$ where a photon of radiant energy (hv) is absorbed by the impinged material with a portion of this energy used to liberate an electron defined as (∅) work function and the remaining energy contributing to the liberated electron's kinetic energy (E). The variables (hv) are Planck's constant h ($6.62606957 \times 10^{-34}$ m² kg/s) and v is frequency in hertz above threshold frequency. Threshold frequency or wavelength is defined as the minimum frequency or wavelength of radiant energy that will produce a photoelectric effect. A preferred material for use by the present invention to absorb impinging radiant energy is defined as that material with the smallest practical mass that generates the highest practical liberated electron kinetic energy from the lowest practical impinging electromagnetic frequency above threshold frequency, and is generally crystal lattice photovoltaic type materials. Other suitable materials may be employed.

Momentum as used herein refers to the principal first deduced by Maxwell that when radiant energy impinges a surface it exerts pressure or the property of momentum. Current understanding of energy to its impinging momentum is consistent with Einstein's $E=mc^2$, which can be reduced by setting rest mass equal to zero and applying the Planck relationship to yield the quantized function of $p=h\nu/c$ where h equals Planck's constant ($6.62606957 \times 10^{-34}$ m² kg/s), v is frequency in Hz, and c is the velocity of radiant energy in a vacuum (299,792,458 m/s). A preferred embodiment of the present invention measures the radiant momentum of a known (measured) level of radiant energy impinging the invention's equal-arm force comparator targets and is a function of two quantities; the known mass (m) of the invention's equal-arm force comparator rotating components and its rotational velocity (V) caused by the impinging energy. These quantities yield radiant momentum (p) in units of kg·m·s−1 as a function of Newton's second law, or laws of motion as p=mV.

Symmetry as used herein is defined as a measurement consistent with physical symmetries attributed to radiant energy laws (equations). With regard to a preferred embodiment of the present invention, symmetrical measurement of adsorbed energy-momentum symmetry is defined as equal to the ratio of radiant energy in accord with Planck's radiation laws, detailed in FIG. 1, to its impinging momentum in accord with Maxwell's radiant momentum laws described above. Measurements inconsistent with these laws are asymmetrical. Further, broken symmetry is defined as a specific wavelength range measuring symmetrical while another mutually exclusive wavelength range measures as asymmetrical.

Applying the above definitions and the skill of a person of ordinary skill, it will be understood that the present invention is useful, at minimum, to confirm, or not, absorbed energy momentum symmetry. Even if such symmetry is not confirmed by a preferred embodiment of the present invention, and instead an asymmetric energy-momentum relationship is found where momentum is greater than expected for measured radiant energy within the non-ionizing or smaller wavelength spectrum, this may indicate a casual mechanism for research indicating a statistical correlation between non-ionizing energy and adverse health effects.

It is well understood that the momentum of impinging radiant energy, in the form of Beta or subatomic particles, penetrate deep inside biological tissues damaging DNA and potentially initiating cancer and is considered dangerous at any energy level. Momentum of ionizing radiant energy also penetrates biological tissues liberating atomic particles from atoms or molecules altering chemical bonds that may cause biological damage resulting in radiation sickness, cancer, or death. The effect of non-ionizing energy, which is energy that is not capable of removing an electron from an atom or molecule, on living tissue is not fully understood and there is currently no known physical casual mechanism by which non-ionizing energy promotes adverse health effects. Significant scholarly research, however, has shown a statistical correlation between long term close-proximity exposure to some non-ionizing electromagnetic energy sources and possible adverse health effects. These studies include an extensive 2005 study by Oxford University which found a 70% increase in the risk of childhood leukemia when living within 200 meters of overhead high power lines however the National Cancer Institute (NIH) recently determined this study to be inconclusive. The National Radiation Protection Board (NRPB) study found evidence of a slight increase in childhood leukemia when exposed to close proximity electromagnetic energy and the National Institute of Health in cooperation with the U.S. Department of Energy's Brookhaven National Laboratory found that 50 minutes of cell phone usage (with the phone muted to avoid confounding effects from auditory stimulation) elevated brain glucose metabolism significantly in the parts of the brain closest to the phone's antenna. With explosive growth projected for close proximity and wearable non-ionizing energy emitting devices, world health organizations call for continued research into finding a possible physical casual link between this exposure and adverse health effects. It is projected that by the year 2020 over 50 billion of these devices will cause unprecedented human exposure to close proximity non-ionizing radiation.

Measuring an anomaly within the feeble force of radiant momentum requires an extremely sensitive device. The probability of finding an anomaly is significantly enhanced by measuring high intensity radiant energy over a large surface area. Prior art radiant momentum measurement devices typically comprise an array of micro mechanical semiconductor sensors that produce or define output capacitance, voltage or resistive changes in electric signals caused by bending, flexing or movement of capacitor, piezoelectric and piezoresistive materials impinged by radiant energy. Such prior art devices are shown in or similar to those shown in U.S. Pat. No. 7,495,199, 8,366,317, 8,664,583, 7,164,131 and 5,220,189, the disclosures of which are incorporated by reference. Prior art sensors are not always acceptable because semiconductor materials can be damaged by high intensity radiation. Also, quantized, processed, and calibrated output signals of prior art micro mechanical semiconductor sensors that are traceable to the radiation law being measured may also produce quantization bias errors that make it difficult to measure trace anomalies. Additionally, use of crystal lattice photovoltaic type materials for radiant energy impinged sensors, as required by the invention device, may cause electric fields that interfere with the electrical output of prior art sensors used to measure radiant momentum.

Explanation of the Invention

It is an aim of the present invention to address the above problems of the prior art and to provide a means of measuring absorbed energy-momentum symmetry from a high intensity radiant energy source measured over a sufficiently large surface area to accurately measure its momentum. In accordance with the present invention, a preferred embodiment contemplates that radiant energy from a blackbody simulator device capable of achieving the highest practical temperatures and emitting highest practical radiant energy intensity is split into two beams by a [50/50] beam splitter, with each beam filtered to a specific chosen monochromatic wavelength. The radiant energy or spectral radiance of each beam is measured in units of watts per steradian per squaremeter per nanometer ($W \cdot sr^{-1} \cdot m^{-2} \cdot nm^{-1}$) by radiant energy sensors directly against the momentum caused by one or both radiant energy beams impinging targets of the inventions equal-arm force comparator device, as shown in FIG. 9, and is measured in units of kilogram meter per second ($kg \cdot m \cdot s^{-1}$) in accord with Newton's laws of motion.

A preferred embodiment of the present invention includes an equal-arm force comparator, such as shown in FIG. 9, is similar in form and function to an equal-arm mass balance which is one of the oldest and most accurate measurement devices. This technology compares the mass of one body directly against the mass of another with a [two-pan] equal-arm balance where the arm lengths are identical and balanced at a bearing or balance point. A preferred embodiment of an equal-arm force comparator according to the present invention is capable of comparing the impinging force of one beam of radiant energy directly against the impinging force of another beam of radiant energy, or against a null or no beam, where radiant energy targets are attached to opposing ends and equal distant from the centerline of a well balanced horizontal arm that is able to rotate about its axis on a nearly frictionless pivot point. The targets of the present invention are similar in function to prior art solar sails, such as those shown U.S. Pat. Nos. 4,614,319 and 6,565,044, the disclosures of which are incorporated by reference, that intercept the force of one or both beams of radiant energy translating this force into rotational velocity of the known mass of the invention's equal-arm force comparator component yielding a measurement of radiant momentum. In this manner, measurement of radiant energy, measured in units of ($W \cdot sr^{-1} \cdot m^{-2} \cdot nm^{-1}$), from one or both beams or radiant energy is compared directly against its impinging force measured as momentum in units of ($kg \cdot m \cdot s-1$), thus deriving absorbed radiant momentum symmetry or differential absorbed radiant momentum symmetry depending on the measurement regime employed. The present invention further improves upon prior art radiometers, spectroradiometers including handheld spectroradiometer type device that measure radiant energy at a specific wavelength or frequency in that the present invention provide a method of calibrating these devices to yield measurement of absorbed energy-momentum symmetry. The method of calibration is achieved by applying the specific relationship between measurements of radiant energy at wavelength (i.e., at a given frequency) to the radiant energies impinging momentum as measured by the invention device. In accordance with the present invention, a preferred embodiment may include a measurement regime having a control sequence that may be performed as shown in FIG. 2.

The foregoing explanation is provided to introduce certain concepts in more general, explanatory form. Such concepts are further described below in the detailed description. The foregoing explanation is not intended to identify key or essential features of the invention, nor is it intended to be used to limit the scope of the claimed invention. Other aspects, features and advantages of the present invention will be apparent from the following detailed description of embodiments and the accompanying drawing figures.

BRIEF DESCRIPTION OF THE DRAWINGS

In the following, the invention will be described in detail with reference to the appended drawings, in which:

FIG. 5 shows components 300 through 502 of an embodiment of a measurement device according to the present invention.

FIG. 10 is comprised of FIGS. 10A, 10B, 10C, 10D, 10E, 10F and 10G, which show exemplar Manufacturers of Prior Art Components Detail in table format.

FIG. 11 shows an embodiment of the invention device optical lens specifications in a table format.

Figure 1:
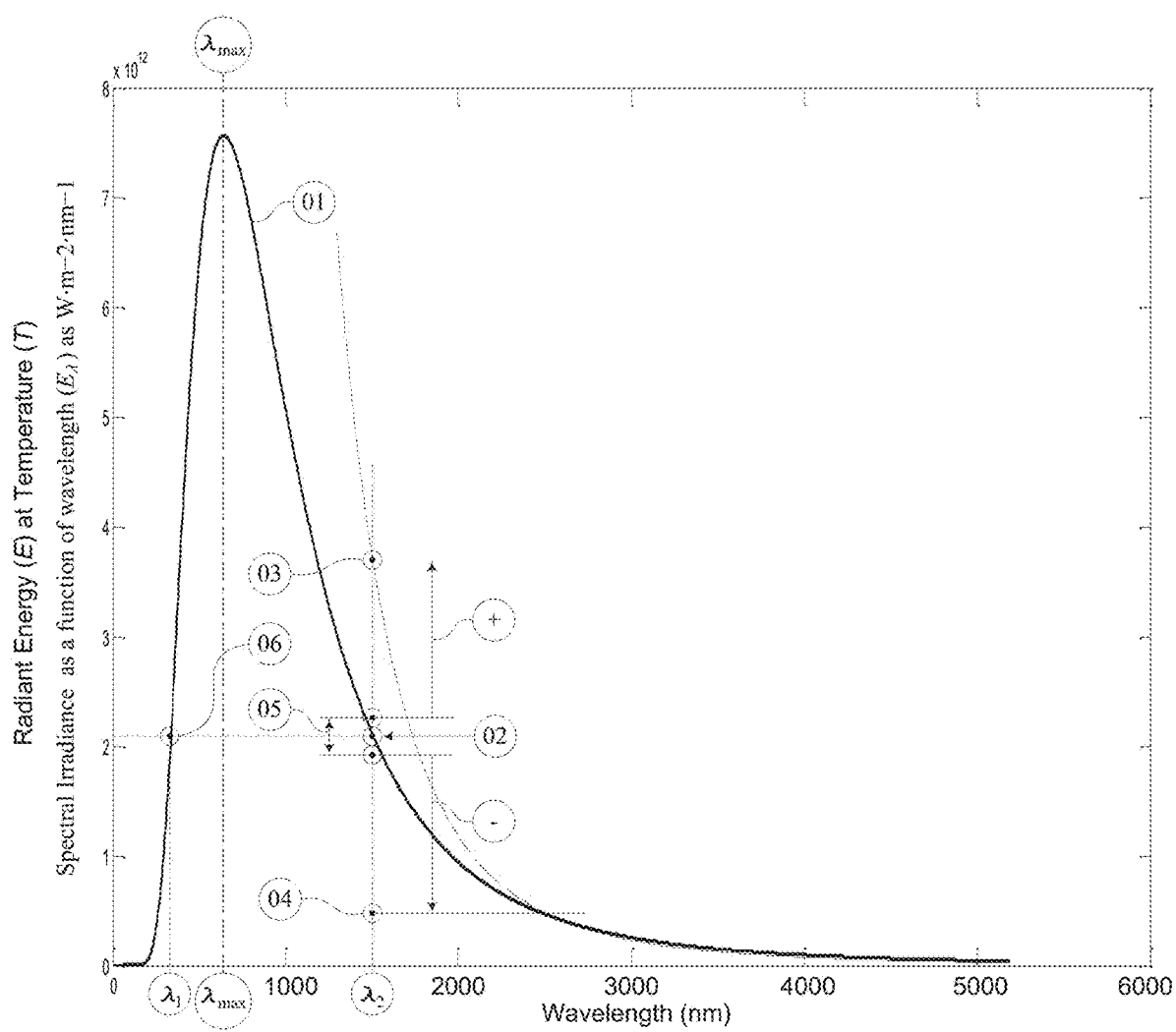
FIG. 1 illustrates and defines Planck's Law, corresponding wavelengths and standard deviation as they relate to measurement concepts in keeping of a preferred embodiment of the present invention.

The drawing figures do not limit the present invention to the specific disclosed embodiments. Further, the drawings are not necessarily to scale, but are intended to illustrate the principles of the invention.

DETAILED DESCRIPTION

FIG. 1 illustrates Planck's Law as it relates to invention measurement concepts. Planck's law derives the electromagnetic energy (radiant energy) distribution curve (01) emitted by a black body in thermal equilibrium, more specifically described as the amount of energy a black body gives off at a specific temperature and frequency or wavelength, as a function of $E_\lambda = (2hc^2/\lambda^5)(1/e^{hc/\lambda k_B T} - 1)$ where:

$E_\lambda$ = Radiant energy or more specifically spectral radiance is measured as $W \cdot sr^{-1} \cdot m^{-2} \cdot \lambda^{-1}$ where W is watts per, $sr^{-1}$ is steradian, m-2 is square meter and $\lambda$ is wavelength usually in meters or nanometers.

h = Planck's constant ($6.626 \times 10^{-34}$ J·s) where joule-second is kg·m²/s.

$\lambda$ = Wavelength in meters (normally nanometers).

c = Speed of radiant energy in a vacuum or 299,792,458 meters per second.

e = Elementary charge, which is a fundamental physical constant having the approximate value of $1.602176565(35) \times 10^{-19}$ coulombs.

$k_B$ = Boltzmann constant at $1.3806488(13) \times 10^{-23}$ J/K.

T = Temperature in Kelvin, expressed as temperature (T) in FIG. 1 or as a function of frequency $E_v = (2hv^3/c^2)(1/e^{hv/k_B T} - 1)$ where:

$E_v$ = Radiant energy or more specifically spectral radiance is measured as $W \cdot sr^{-1} \cdot m^{-2} \cdot Hz^{-1}$ where W is watts per, $sr^{-1}$ is steradian, m-2 is square meter and Hz is cycles per second.

v = Frequency in Hz or cycles per second.

E = Measured radiant energy at any point along Planck's blackbody radiant curve can be expressed as E=nhv where (n) is a discrete integer. Thus, total amount of energy emitted or absorbed by a body will be some whole number quanta.

$\lambda_{max}$ is the wavelength at which radiation by a black body in thermal equilibrium reaches its maximum radiant power or spectral radiance and is a function of b/T where b is a constant of proportionality called Wien's displacement constant, equal to $2.8977721(26) \times 10^{-3}$ m K, and T is temperature measured in Kelvin. Alternatively, $v_{max}$ is the frequency at which radiation by a black body in thermal equilibrium reaches maximum radiant power or spectral radiance and is a function of $\alpha/h$ (kT) where a is a maximization equation constant approximately 2.821430, h is Planck's constant, k is the Boltzmann constant, and T is temperature in Kelvin. Corresponding wavelengths are any two wavelengths from a blackbody radiation source at a constant temperature (T) where one is greater than $\lambda_{max}$ and one is less than $\lambda_{max}$, both having equal radiant energy ($E_\lambda$) measured in $W \cdot sr^{-1} \cdot m^{-2} \cdot Hz^{-1}$ along Planck's blackbody radiation curve (01) as expressed by Planck's Law. An example of corresponding wavelengths within FIG. 1 are $\lambda_1$ and $\lambda_2$ at equal radiant energy points (02) and (06). Additionally, corresponding frequencies may be any two frequencies $v_1$ and $v_2$ where one frequency is greater than $v_{max}$ and one wavelength is less than $v_{max}$ with both having equal radiant energy ($E_v$) measured in $W \cdot sr^{-1} \cdot m^{-2} \cdot Hz^{-1}$ along Planck's blackbody radiation curve as expressed by Planck's Law.

Radiant momentum is a function of p=hv/c as explained within the Background and Usefulness of Invention of this embodiment where h equals Planck's constant ($6.62606957 \times 10^{-34}$ m² kg/s), v is frequency in Hz, and c is the velocity of radiant energy in a vacuum (299,792,458 m/s). If the function of p=hv/c and the fundamental laws of conservation of energy and momentum are valid, then derived radiant energy ($E_d$) is defined as radiant momentum (p) as measured in accordance with the present invention times (c) or $E_d$=pc in units of $W \cdot sr^{-1} \cdot Hz^{-1}$ at any radiant energy source temperature, wavelength or frequency.

If derived radiant energy ($E_d$), point 03, is greater than the actual radiant energy, point 02, as measured by the present invention at any wavelength $\lambda_2$ and source temperature T then derived radiant energy is defined as positive ($+E_d$). If derived radiant energy ($E_d$), point 04, is less than the actual radiant energy as measured by the present invention, point 02, at any wavelength $\lambda_2$ and source temperature T then derived radiant energy is defined as negative ($-E_d$).

Figure 9:
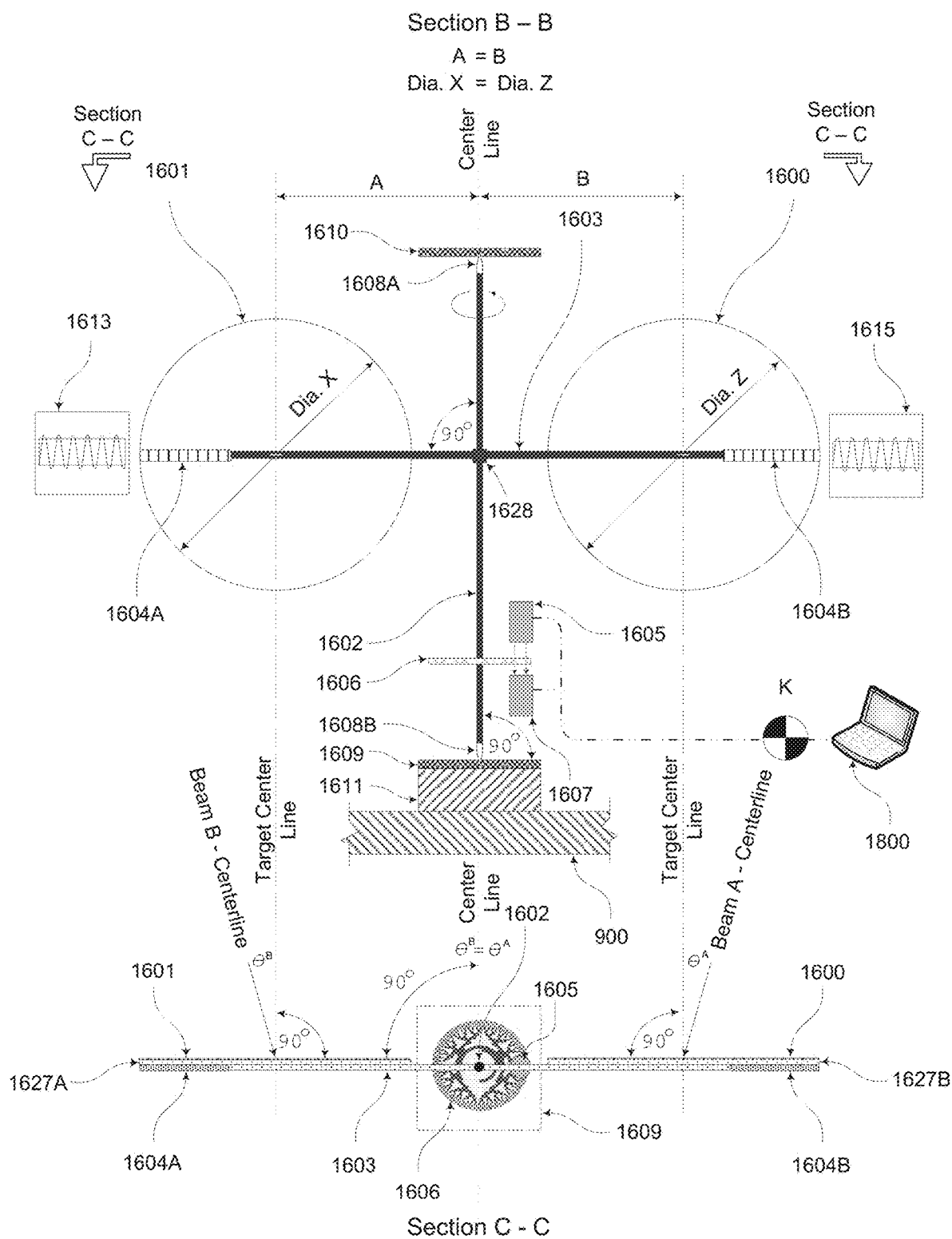
FIG. 9 shows a detail of an embodiment of an equal-arm force comparator device according to the invention.

Positive derived radiant energy ($+E_d$) may or may not be the result of a form of dark energy that is not measurable by prior art radiometric devices and negative derived radiant energy ($-E_d$) may or may not be a function of efficiency losses caused by an embodiment of the invention, such as friction loss of the rotating equal-arm force comparator components shown in FIG. 9, which shall be kept as small as practical. Standard deviation of a preferred embodiment of the present invention is the amount of variation or dispersion from average measurement results (05). In addition to conventional means of deriving the standard deviation, the present invention enables the comparison of constant source 100 temperatures and wavelengths using the three measurement regimes defined in FIG. 2. Under these conditions, measurement results should be equal, within a reasonable standard deviation, across measurement regimes.

Figure 2:
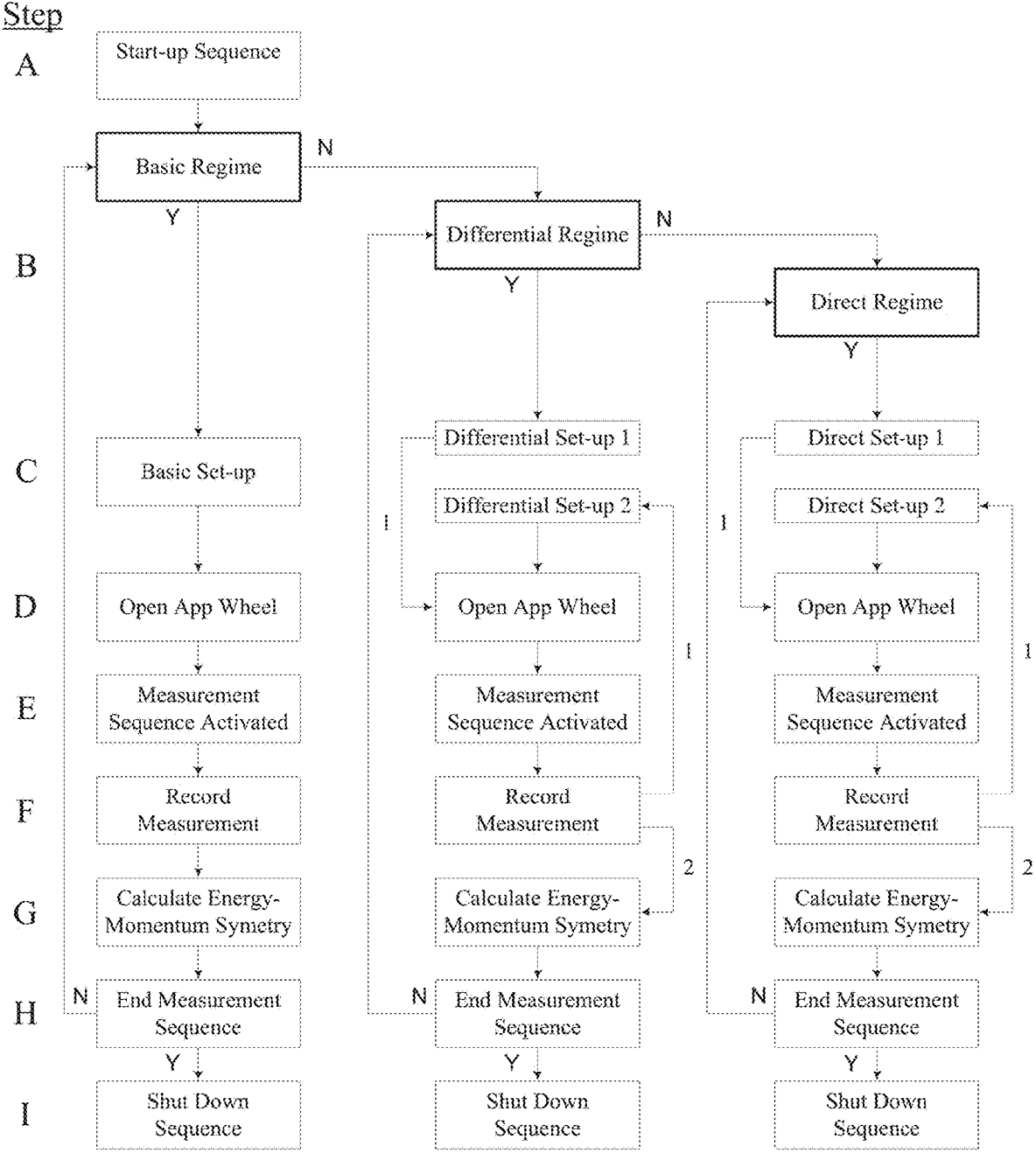
FIG. 2 shows a control sequence for Basic, Differential, and Direct measurement regimes in flow chart format in accordance with the present invention.

FIG. 2 shows three (3) energy-momentum symmetry measurement regimes in flow diagram format. The standard measurement method for these regimes is for Beam A radiant energy to always be smaller than or equal to the wavelength of Beam B; $\lambda$ Beam A$\leq\lambda$ Beam B.

Step A is the Start-up Sequence of a preferred embodiment of the present invention. This sequence is the same for all three measurement regimes (see FIG. 2) and includes but is not limited to an operator choosing, within programmable logic controller (PLC) 1800, the desired wavelength of Beam A, the temperature of blackbody radiation calibrator source 100, shutter 500 exposure time, and the opening size of aperture wheel and energy stop 200. After the preceding choices are made, PLC 1800 implements the Start-up Sequence by configuring aperture wheel and energy stop 200 to closed position 209, turning on cooling water or liquid nitrogen, turning on blackbody radiation source 100 and allowing it to obtain set temperature, rotation stage 1619 and electromagnets 1613 and 1615 are turned on, targets 1600 and 1601 are rotated into measurement ready position, which is defined in FIG. 9, shutter 500, choppers 1500 and 1510, and positioning mirror 1200 and 1210 are all closed.

In Step B, the operator chooses any of the measurement regimes Basic Regime, Differential Regime or Direct Regime measurement sequence. Basic Regime measures absorbed energy-momentum symmetry at corresponding frequency or wavelength in decision problem format (Yes or No symmetry). Corresponding frequency or wavelength is defined in FIG. 1. When two beams of radiant energy, at corresponding frequency or wavelength, impinge the invention's equal-arm force comparator component FIG. 9, at the same angle of incidence and same instant and duration of time, any rotational velocity measured Step-F (FIG. 2), of the embodiment of the invention's force comparator component shown in FIG. 9, is defined as measurement of No-symmetry or asymmetrical absorbed energy-momentum. If the force comparator of the embodiment shown in FIG. 9 does not rotate, it is defined as measurement of Yes-symmetrical absorbed energy-momentum. Differential Regime compares Beam A radiant energy ($E_{e\lambda A}$) and Beam B radiant energy ($E_{e\lambda B}$) split from a single source of blackbody radiation at any chosen frequency or wavelength and temperature against the differential radiant momentum imparted by these beams impinging the invention's equal-arm force comparator, shown in FIG. 9, at the same instant and duration of time. Differential momentum ($\Delta p$) is measurement of the maximum rotational velocity of the known mass of the invention's equal-arm force comparator mechanism caused by impinging Beam A and Beam B by sensors 1605, 1606 and 1607, FIG. 9, in accord with Newton's laws of motion. Differential absorbed energy-momentum is defined as the ratio of ($E_{e\lambda A}-E_{e\lambda B}$) to its impinging differential momentum ($\Delta p$). Differential measurement regime derives absorbed energy-momentum symmetry measurement in units of $\Delta$ W·sr$^{-1}$·m$^{-2}$·nm$^{-1}$ to kg m·s−1. Symmetry of this measurement, as used herein, is defined as a measurement that is consistent with physical symmetries attributed to radiant energy laws (equations) as described in detail within the Background and Usefulness of Invention section of this embodiment.

Direct Regime compares Beam A radiant energy ($E_{e\lambda A}$) or Beam B radiant energy ($E_{e\lambda B}$) split from a single source of blackbody radiation at any chosen frequency or wavelength and temperature against the differential radiant momentum imparted by either Beam A or Beam B impinging target 1600 or 1601 of the equal-arm force comparator according to the present invention as, shown in FIG. 9, at a known instant and duration of time as described further in Step-F. The maximum rotational velocity (V) of the known mass (m) of the rotational components of the force comparator device, shown in FIG. 9, caused by Beam A or Beam B impinging target 1600 or 1601 against a null or no beam impinging the opposing target 1600 or 1601 is measurement of Direct radiant momentum of Beam A ($p_A$) or Beam B ($p_B$) and defined as the ratio of ($E_{e\lambda A}$) to ($p_A$) or ($E_{e\lambda B}$) to ($p_B$).

If Basic Regime measurement sequence is chosen in Step B, then Step C entails PLC 1800 calculating the corresponding wavelength of Beam B for chosen Beam A in Step A in accord with Planck's Law, FIG. 1, and setting monochromator 810 to this corresponding wavelength. At Step C, PLC 1800 also opens positioning mirrors 1200 and 1210, choppers 1400 and 1410, and aperture wheel and energy stop 200 to opening size set in Step A releasing equal-arm force comparator rotating mechanism, FIG. 9, by turning off electromagnets 1613 and 1615. Step D entails PLC 1800 opening aperture wheel and energy stop 200 to the specific aperture opening set in Step A. Step E shutter 500 is actuated at exposure time set in Step A. As soon as the exposure is complete and shutter 500 is closed, the aperture wheel and energy stop 200 is rotated back to energy stop or closed position 209. Step F fixed light emitting diode 1605 is modulated by rotation of high density scaled encoder disk 1606, monitored by opto-electric sensor 1607 which transforms optical stimulation to an electrical response that is transmitted through I/O connector K, to PLC 1800. Step G PLC 1800 processes any modulated signal is translated into a measurement output of No-Symmetry or asymmetrical absorbed energy-momentum. If there is no modulated signal from I/O connector K then PLC 1800 processes the signal into Yes-Symmetry or symmetrical absorbed energy-momentum. Step H the operator makes a choice between taking another measurement, whereby the operations sequence goes back to Step B, or the operator chooses to shut down the measurement regime sequence Step I. Step I Shut Down Sequence is the same for all three measurement regimes which includes, but is not limited to PLC 1800 turning off radiant energy source 100, rotating stage electromagnets 1613 and 1615, and shutter 500. Choppers 1500 and 1510 and positioning mirrors 1200 and 1210 are in a normally closed position when a device in accordance with the invention is turned off. Once source 100 reaches ambient temperatures the water or liquid nitrogen cooling source is turned off.

If Differential Regime measurement sequence is chosen in Step B, then Step C Set-up 1 entails choosing the wavelength of Beam B by setting monochromator 810 to any wavelength greater than Beam A through PLC 1800. Step D Set-up 1 entails PLC 1800 opening aperture wheel and energy stop 200 to the specific aperture opening set in Step A. As soon as the aperture wheel and energy stop 200 is rotated to the aperture opening chosen in Step A, the measurement sequence is activated. Step E measurement sequence entails actuating shutter 500 to exposure time set in Step A enabling Beam A and Beam B to be reflected into spectral radiance sensors 1300 and 1310 by positioning mirrors 1200 and 1210. In Step F, an electrical response from spectral radiance sensors 1300 and 1310 is transmitted to PLC 1800 through I/O connectors H and I recording the spectral irradiance of Beam A and Beam B in W·m−2·nm−1. As soon as signal is received by PLC 1800 from spectral radiance sensors 1300 and 1310, aperture wheel and energy stop 200 is rotated to energy-stop or closed position 209. The operations sequence goes to Step C Set-up 2 where choppers 1400 and 1410 and mirrors 1200 and 1210 are opened. Additionally, electromagnets 1613 and 1615 are turned off releasing equal-arm force comparator rotating mechanism, FIG. 9. Step D Set-up 2 entails PLC 1800 opening aperture wheel and energy stop 200 to the specific aperture opening set in Step A. Step E Set-up 2 shutter 500 is actuated at exposure time set in Step A enabling Beam A and Beam B to impinge the invention's equal-arm force comparator targets 1600 and 1601, FIG. 9, at the same angle of incidence and same instant and duration of time. Once targets 1600 and 1601 are exposed for the time set in Step A, shutter 500 is closed and immediately thereafter aperture wheel and energy stop 200 is closed or rotated to energy stop position 209. In Step F Set-up 2, a fixed light emitting diode 1605 is modulated by rotation of high density scaled encoder disk 1606, monitored by opto-electric sensor 1607 which transforms optical stimulation to an electrical response that is transmitted through I/O connector K to PLC 1800 recoding measurement of the maximum rotational velocity (V) of the rotational components of the equal-arm force comparator, FIG. 9. In Step-G of the Differential Regime measurement sequence, radiant energy of Beam-A ($E_{e\lambda A}$) and Beam-B ($E_{e\lambda B}$) measured in Step-F Set-up 1 sequence is compared against the differential momentum these two beams impart when impinging the invention's equal-arm force comparator, FIG. 9, measured in Step-F Set-up 2. Differential momentum is measured as a function of the maximum rotational velocity (V), measured in Step-F Set-up 1, of the known mass (m) of the force comparator device, detailed in FIG. 9, caused by impinging spectral radiant energy of Beam A and Beam B against targets 1600 and 1601. The angular momentum (L) of the inventions equal-arm force comparator device, detailed in FIG. 9, is a function of L=Σr·mV, less friction losses where L is measured in units of kg·m2·s−1 and L/Σr equals differential radiant momentum (Δp) measured in units of kg m·s−1. Σr is the sum distances (r) from axis point 1602 to the point where radiant energy impinges targets 1600 and 1601, m is mass in kg and V is the maximum rotational velocity in m·s−1 of the equal-arm force comparator device caused by the impinging radiant energy is measured by an opto-electric sensor detailed within FIG. 9. Step G differential energy-momentum symmetry is calculated by PLC 1800 as the ratio of differential radiant energy (the radiant energy of Beam A minus the radiant energy of Beam B ($E_{e\lambda A}$−$E_{e\lambda B}$) measured in Step F Set-up 1) to its impinging differential momentum (Δp) measured in Step F Set-up 2 in units of W·s−1·m−2·nm−1 to kg m·s−1. Step H & I are the same as described within the Basic Regime measurement sequence described above.

If Direct Regime measurement sequence is chosen in Step B, then Step C Set-up 1 entails choosing if Beam A or Beam B is to be measured. If Beam A is chosen for measurement, then chopper 1500 is open and chopper 1510 is closed. If Beam B is chosen for measurement, then chopper 1500 is closed and chopper 1510 is open. Step D Set-up 1 entails PLC 1800 opening aperture wheel and energy stop 200 to the aperture opening chosen in Step A. As soon as the aperture wheel is open the measurement sequence is activated. Step E Set-up 1 entails actuating shutter 500 to exposure time set in Step A enabling Beam A and Beam B to be reflected into spectral radiance sensors 1300 and 1310 by positioning mirrors 1200 and 1210. In Step F Set-up 1, an electrical response from spectral radiance sensors 1300 and 1310 is transmitted to PLC 1800 through I/O connectors H and I recording the spectral irradiance of Beam A and Beam B in W·sr−1·m−2·nm−1. As soon as signal is received by PLC 1800 from spectral radiance sensors 1300 and 1310, aperture wheel and energy stop 200 is rotated to energy-stop or closed position 209. The operations sequence goes to Step C Set-up 2; if Beam A is measured, then chopper 1500 is open and chopper 1510 is closed. If Beam B is measured, then chopper 1500 is closed and chopper 1510 is open. Additionally, electromagnets 1613 and 1615 are turned off releasing equal-arm force comparator rotating mechanism, FIG. 9. Step D Set-up 2 entails PLC 1800 opening aperture wheel and energy stop 200 to the specific aperture opening set in Step A. In Step E Set-up 2, shutter 500 is actuated at exposure time set in Step A enabling Beam A or Beam B to impinge the preferred embodiment of the present invention as shown in FIG. 9 an equal-arm force comparator component, FIG. 9, depending upon the choice made in Step C Set-up 1. If Beam A was chosen, then target 1600 is impinged and no beam or null beam impinge target 1601. If Beam B was chosen, then target 1601 is impinged and no beam or null beam impinge target 1600. In Step F Set-up 2, a fixed light emitting diode 1605 is modulated by any rotation of high density scaled encoder disk 1606, monitored by opto-electric sensor 1607 which transforms any optical stimulation to an electrical response that is transmitted through I/O connector K to PLC 1800 recoding measurement of direct energy-momentum symmetry. In Step-G of the Direct Regime measurement sequence, radiant energy of Beam A ($E_{e\lambda A}$) or Beam B measured in Step-F Set-up 1 sequence is compared against the differential momentum caused by either Beam A impinging target 1600 or Beam B impinging target 1601 of the invention's equal-arm force comparator, FIG. 9, measured in Step-F Set-up 2. The angular momentum (L) of the inventions equal-arm force comparator device is the same as described within the Differential Regime, described above. Step G direct energy-momentum symmetry is calculated by PLC 1800 as the ratio of the radiant energy of Beam A ($E_{e\lambda A}$) or Beam B ($E_{e\lambda B}$), measured in Step F Set-up 1, to its impinging momentum (p) measured in Step F Set-up 2 and is equal to the ratio of ($E_{e\lambda A}$) or ($E_{e\lambda B}$), measurement in units of W·sr−1·m−2·nm−1, to its impinging momentum (p) measurement in units of kg m·s−1. Step H & I are the same as described within the Basic Regime measurement sequence described above.

Figure 3:
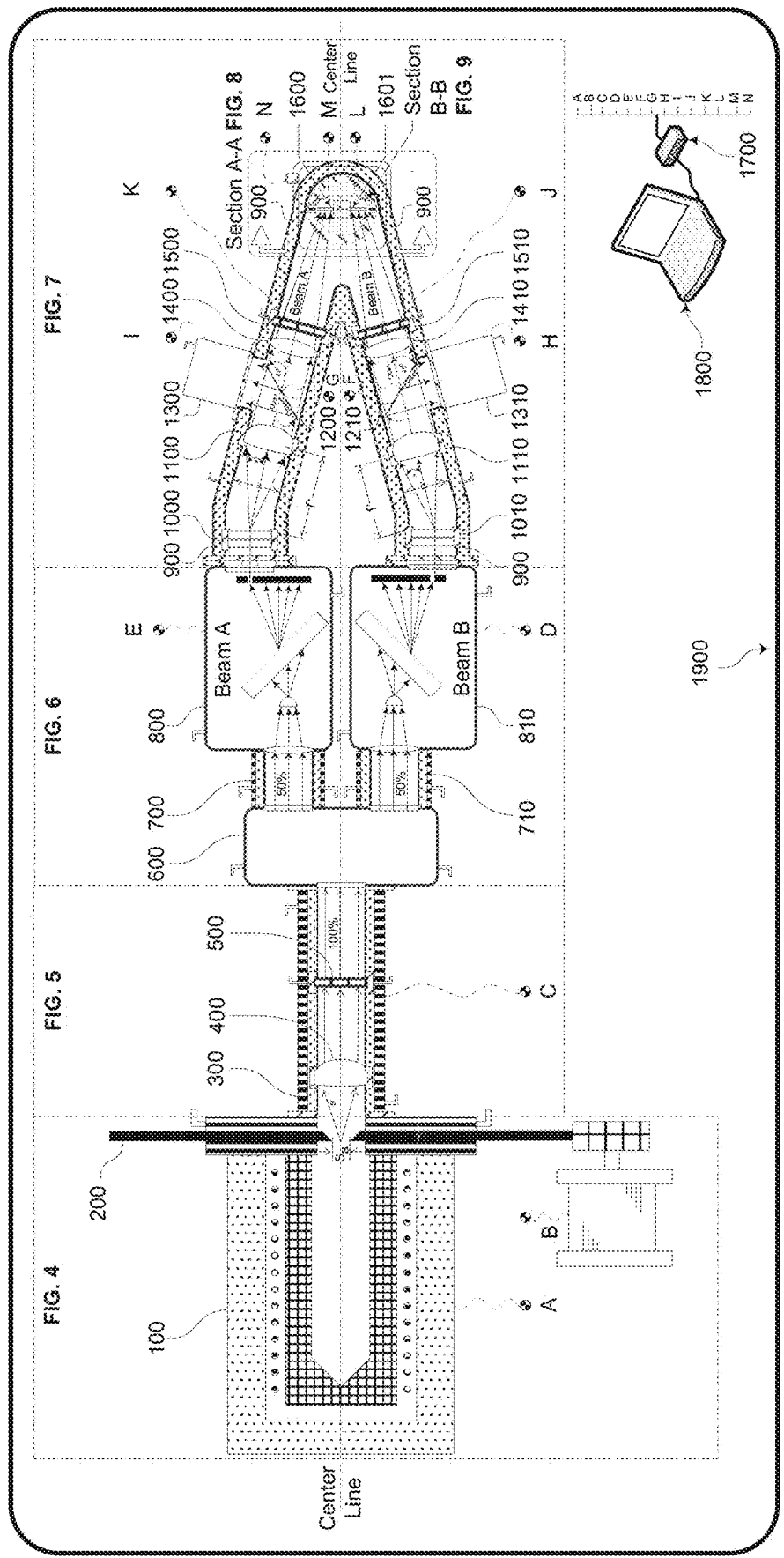
FIG. 3 shows an embodiment of the present invention, specifically showing an embodiment of a measurement device in overview form, identifying how sub-components may be divided into additional figures.

FIG. 3 shows an overview of all components of the embodiment shown in the drawings segmented into detailed sections FIG. 4 through FIG. 9. The purpose of the invention device is to measure absorbed energy-momentum symmetry, utilizing the measurement regimes defined in FIG. 2, at the highest degree of accuracy practical. The optical cavity of all invention components shall operate at as close to zero Torr vacuum and as high a temperature as is practical without damage, providing proper spacing, conduction mounting of optical components and shield against stray radiation. Stray radiation shall be kept equal to or better than $1.5 \times 10^{-4}$ at 1 nm measured at 20 nm from a 633 nm laser line. All optical components down stream from aperture wheel and energy stop 200 shall be capable of dissipating exposure from electromagnetic energy source 100 for a long enough period of time to acquire measurement of absorbed energy-momentum symmetry without damage. Where practical, all components are cooled with chilled water or liquid nitrogen. The entire device may be isolated from vibration or shock by isolation table 1900, that shall be equivalent or better than Technical Manufacturing Corporation (TMC) STACIS® iX LaserTable-Base™ active inertial vibration cancellation system for optical tables, FIG. 10. Logic controls of all controllable electronic components is preferably connected by I/O or input/output connectors A through N to hub 1700 and Programmable Logic Controller (PLC) 1800 enabling the operator to set and control process variables of the invention as described within FIG. 2. PLC 1800 shall be equal to or better than Allen Bradley Micro850™ controller, and hub 1700 shall be equal to or better than Cisco Industrial Ethernet 3000 Switches & Hubs, FIG. 10.

Figure 4:
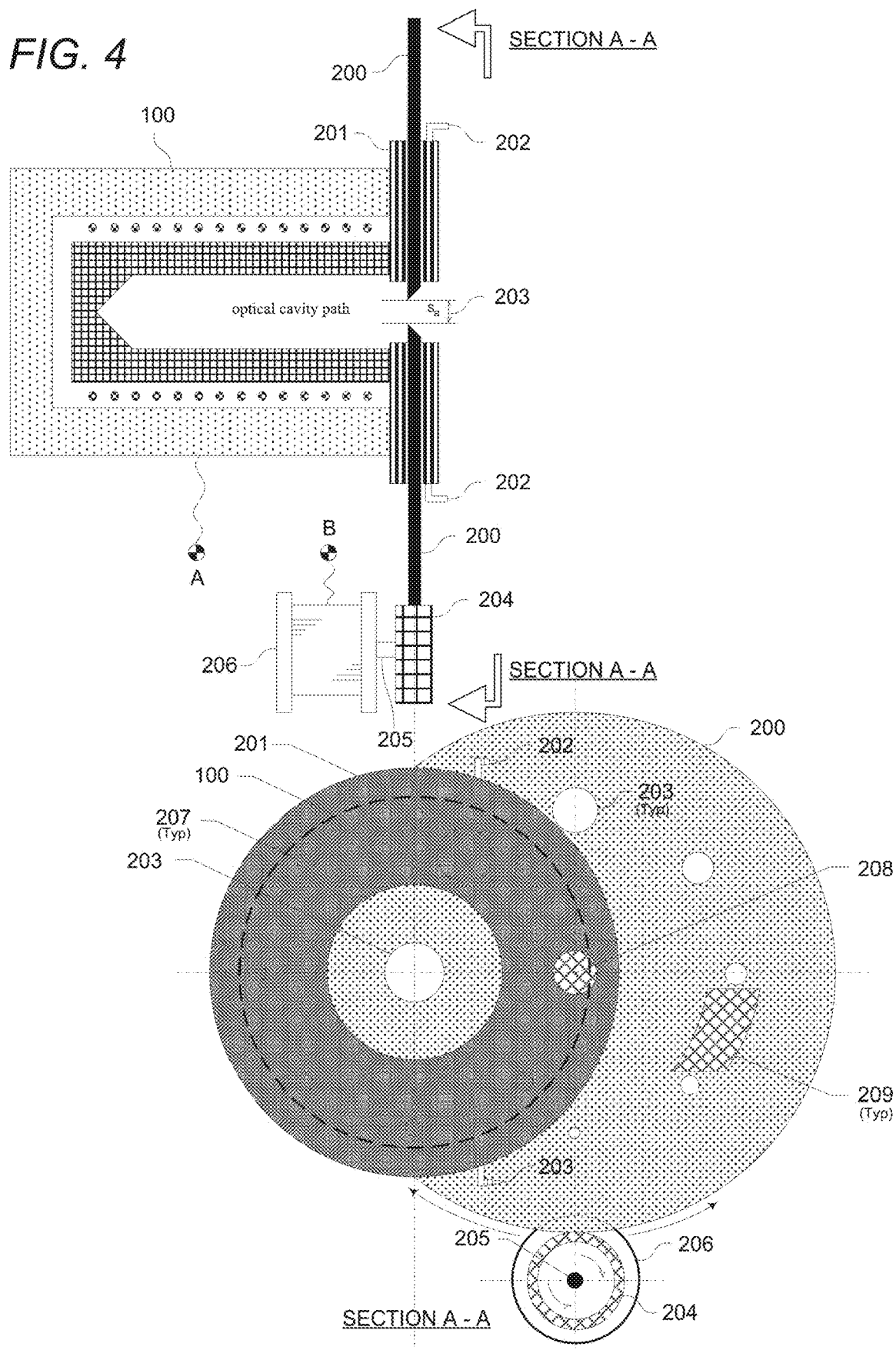
FIG. 4 shows components 100 through 209 of an embodiment of a measurement device according to the present invention.

FIG. 4 show details of blackbody radiation calibration source 100 and water or liquid nitrogen cooled aperture wheel and energy stop 200 according to an embodiment of the present invention. Component 100 is a blackbody radiation calibration source capable of achieving temperatures of 3,000° C., or greater, with the highest emissivity and the largest emitter size practical having a National Institute of Standards and Technology (NIST) traceable certification. Blackbody calibration sources are normally used for the calibration or verification of temperature measurements of pyrometers, thermal imaging systems, heatflux measurement systems or spectrographic analysis systems. The invention is capable of utilizing this component as an accurate high intensity electromagnetic energy source with radiant energy output traceable to Planck's blackbody radiation curve, FIG. 1, at any chosen temperature within the device temperature range. Component 100 is equal or superior to a Mikron Infrared Inc. series M390/395 prior art devices, or Thermo Gauge Instruments WV 26719, series HT-9500 prior art device, FIG. 10. Connector A interfaces with Programmable Logic Controller (PLC) 1800 enabling the operator to monitor, record and set the process variables, including temperature, of component 100. Water or liquid nitrogen cooled aperture wheel and energy stop 200 is a device that controls the output of electromagnetic energy from source 100 by rotating aperture wheel and energy stop 200 to an energy-stop closed position 209 or a specific aperture size opening 203 for a specific period of time. Aperture wheel and energy stop 200 is secured in housing 201 that is connected by light-tight connectors 207 to blackbody radiation calibration source 100. The device may have at least six (6) different aperture sizes 203 designed to pass an optimal range of electromagnetic energy to device components downstream from source radiant energy, 100. Aperture wheel and energy stop 200 is rotated by hand or automatically by friction wheel 204 attached to a shaft 205 connected to a stepper motor or other type electric control motor 206, which is connected through interface B to Programmable Logic Controller (PLC) 1800, enabling the operator to automatically select aperture size 203 and the length of time the aperture stays in the open position before it is automatically rotated to an energy-stop closed position 209. The open-shut response time of aperture wheel and energy stop 200 shall be less than 1 second or as quick as practical. The aperture wheel is rotated around the pivot point 208 and is cooled through water or liquid nitrogen source connectors 202, enabling the aperture wheel and energy stop 200 to be operated in a closed position 209 for an indefinite period of time. Water or liquid nitrogen cooled aperture wheel and energy stop 200 is the primary component mitigating damage to all downstream components from high intensity thermal energy source 100. Aperture wheel and energy stop 200 is equal or superior to LumaSense M390-600 prior art device FIG. 10.

FIG. 5 water or liquid nitrogen cooled stand-off connector 300 provides a light tight optical cavity and stable heat sink conduction mounting for collimator 400 and shutter 500. Stand-off connector 300 is used to maintain a vacuum environment, provide proper mounting and spacing between optical elements, and shield against scattered radiation. Stray light within chilled stand-off connector 300 shall be kept equal to or better than $1.5 \times 10^{-4}$ at 1 nm measured at 20 nm from a 633 nm laser line. Chilled Stand-off connector 300 materials shall be capable of operating at temperatures up to 3,000 C., or the highest temperature practical, FIG. 11. Universal flanges 301 shall be machined with numerous mounting holes 305 to accept connectors 207 of housing 201 (shown FIG. 4) containing aperture wheel and energy stop 200 on one end and connects beam splitter mounting flange 601 on the opposite end of stand-off connector 300. Water or liquid nitrogen source connectors 302, heat sink jacket 303 providing a heat sink for collimator 400 and shutter 500 through conduction mounts 401 and 501. Component 300, 301, and 303 are equal or superior to custom vacuum tight optical conduit products manufactured by CeramTec, FIG. 10, functioning in an environment that is as close to zero Torr and 3,000 degree C. or higher, as is practical. Water cooled stand-off connector 300 interior shall be coated with high energy absorbing materials 304 that shall absorb, to the greatest degree practical, any stray impinging electrons or electromagnetic energy. Absorbing coating material 304 is equal or superior to absorbing carbon nanotube coatings manufactured by Surrey NanoSystems, FIG. 10.

Collimator 400 is a device that narrows and aligns energy from source 100 within 3 degrees of orthogonal to the input face of shutter 500. High numerical aperture aspheric collimator lens 400, specified in FIG. 11, provides precise collimation of electromagnetic energy in the wavelength range between 200 to 3000 nm with an aperture size optimized for maximum output from energy source 100. Collimator lens 400 is conduction mounted 401 within chilled stand-off connector 300 providing a solid heat conduction path to stand-off connector water jacket 303 that is adequately chilled, through water or liquid nitrogen source connectors 302 to dissipate exposure from source 100 electromagnetic energy for a long enough period of time to acquire measurement of energy-momentum symmetry without damage. The focal length (f) of collimator lens 400 from aperture opening 203 of aperture wheel and energy stop 200 shall be as short a distance as practical to optimize the collection of electromagnetic energy from source 100. The diameter (D) of collimator lens 400 shall be large enough to capture as much electromagnetic energy as is practical emitted from the largest aperture opening 203 of energy source 100. The F-number (F) is approximately a function of F=f/D varying as $1/(F)^2$ where decreasing F maximizes light collection up to the point where the beam is coherent enough to refocus. More specifically $F=\frac{1}{2}n \sin \theta$, where n equals refractive index, which is 1 in a vacuum, and θ equals the half angle of the cone of radiation as shown herein. The F number shall be keep as small as practical. Collimator lens 400 shall be manufactured of materials equal or superior to high-quality polycrystalline CVD (chemical vapor deposition) diamond materials that exhibit excellent optical, thermal and mechanical properties. The physical property of collimator lens 400 is defined in FIG. 11 and is equal or superior to lenses manufactured by Element 6 and II-VI Infrared as detailed within FIG. 10.

Water cooled heat-load shutter 500 controls exposure time of downstream components including targets 1600 and 1601 of the equal-arm force comparator, FIG. 9, from impinging electromagnetic energy generated from blackbody radiation calibration source 100 within an ultrahigh-vacuum environment defined in FIG. 3. Damage threshold and thermal conductivity are key design properties of shutter 500. Shutter 500 is conduction mounted 501 within stand-off connector 300 utilizing high thermal conductivity materials that provide a large cross section of material with a solid heat conduction path that is cooled directly through chilled water or liquid nitrogen source connectors 502 and indirectly through heat conduction path to water or liquid nitrogen cooled stand-off connector water jacket 303 through connectors 302. The energy dump heat sink capabilities of shutter 500 mounting 304 shall provide adequate thermal dissipation to be operated safely in a closed position for as long a period of time as practical, or a minimum of 3 seconds, without incurring operational damage, keeping damage threshold at the highest practical level. Electromagnetic energy beam from maximum aperture setting 203 of aperture wheel and energy stop 200 shall be aligned within 3 degrees of orthogonal to the input face of shutter 500 by collimator lens 400 and shall be no greater than 50-80 percent of the aperture diameter of shutter 500. Operational control sequence functions of shutter 500 shall be actuated from custom or manual timing signals through connection C to PLC controller component 1800. Shutter 500 is normally closed with 0% transmittance of energy produced by the light source 100. Shutter 500 full aperture open or shut response time may be as small as practical with highly stable amplitude regulation of 0.01% or better. Control sequence functions of shutter 500 are detailed in FIG. 2. Shutter 500 is similar to high intensity heat-load Bremsstrahlung safety shutters integrated with a photon shutter manufactured by FMB Oxford FIG. 10.

Figure 6:
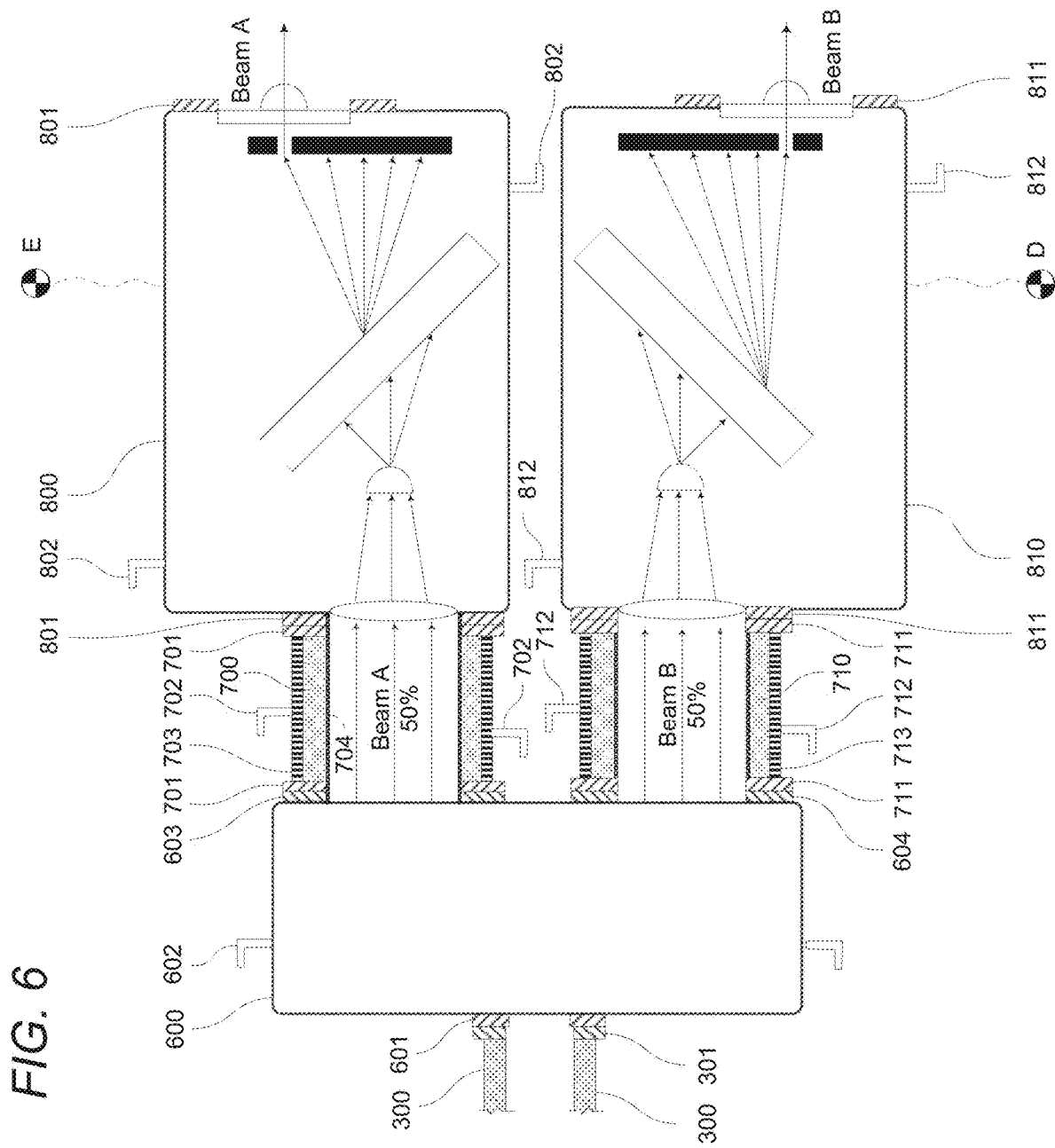
FIG. 6 shows components 600 through 812 of an embodiment of a measurement device according to the present invention.

FIG. 6 shows a beam splitter 600 in accordance with the present invention to divide radiant energy beam form source 100 into Beam A and Beam B each with 50 percent of total source 100 energy. Beam A and Beam B are filtered to chosen monochromatic wavelengths by monochromators 800 and 810. Commercially available beam splitters include cube, harmonic, plate, pellicle, and polka dot and may be polarized or non-polarized. The beam splitter 600 may be a commercially available non-polarized high-energy broadband beam splitter operating in a wavelength range equal to or greater than 200 to 3000 nm having a reflection/transmission ratio that is as close as practical to 50/50% energy split with no secondary ghost reflections or beam displacement. Beam splitter 600 is connected to stand-off connector 300 by universal flange 301 connected to beam splitter connecting flange 601. Beam splitter 600 is cooled by chilled water or liquid nitrogen through connector 602 providing adequate thermal dissipation to be operated safely for a long enough period of time to acquire an accurate measurement of energy-momentum symmetry without incurring damage. The operational damage threshold of beam splitter 600 may be as high as practical. Beam splitter 600 is equal or superior to diamond or polka dot beam splitter manufactured by Optometrics, Element Six, and nitrogen cooled beam splitter by Thermo Electron Spectroscopy, FIG. 10. Water or liquid nitrogen cooled stand-off connector 700 and 710 provide a light tight optical cavity connection between beam splitter 600 and monochromators 800 and 810. Universal flanges 701 and 711 shall be machined with numerous mounting holes to accept mounting flanges 603 and 604 which connects beamsplitter 600 to monochromators 800 and 810 through flanges 801 and 811 Water or liquid nitrogen source connectors 702 and 712 supply thermal transfer fluid to heat sink jacket 703 and 713. Water cooled stand-off connector 700 and 710 interior shall be coated with high energy absorbing materials 704 absorbing, to the greatest degree practical, any stray impinging electrons or electromagnetic energy. Absorbing coating material 704 is the same as 304 absorbing carbon nanotube coatings, FIG. 10

Monochromator 800 and 810 are optical devices that transmit a mechanically selectable narrow band wavelength of electromagnetic energy from source 100 that can be set manually or programmatically through I/O connectors E and D to PLC controller 1800. Monochromator 800 and 810 are chilled by water or liquid nitrogen through connectors 802 and 812 that provide adequate thermal dissipation to acquire accurate measurement of absorbed energy-momentum symmetry. The preferred monochromators 800 and 810 may be a commercially available device that enable the operator to set process variables as defined within FIG. 2. The monochromators 800 and 810 preferably meet or exceed the following specifications:

Resolution of 0.006 nm, step size of 0.002 nm, spectral range of 150 nm to 3000 nm with appropriate interchangeable gratings, wavelength accuracy of ±0.20 nm, repeatability of ±0.075 nm, a dispersion value of 0.65 nm/mm, stray light of $1.5 \times 10^{-4}$ at 1 nm or less measured at 20 nm from a 633 nm laser line and an aperture of approximately f/4 or a size optimized to receive a beam from the largest aperture size 203 available from aperture wheel and energy stop 200. A monochromator in accordance with the present invention may be capable of receiving thermal energy from 3,000 C. source, or as high a temperature as is practical from blackbody electromagnetic energy source 100 that has been split into two beams of equal energy by beam splitter 600 for an adequate period of time to acquire measurement of absorbed energy-momentum symmetry by the invention device without being damaged.

Monochromators 800 and 810 may be similar to commercially available high heat flux monochromators manufactured by Element 6 diamond monochromators, PSL water-cooled grating chamber monochromators, FIG. 10.

Figure 7:
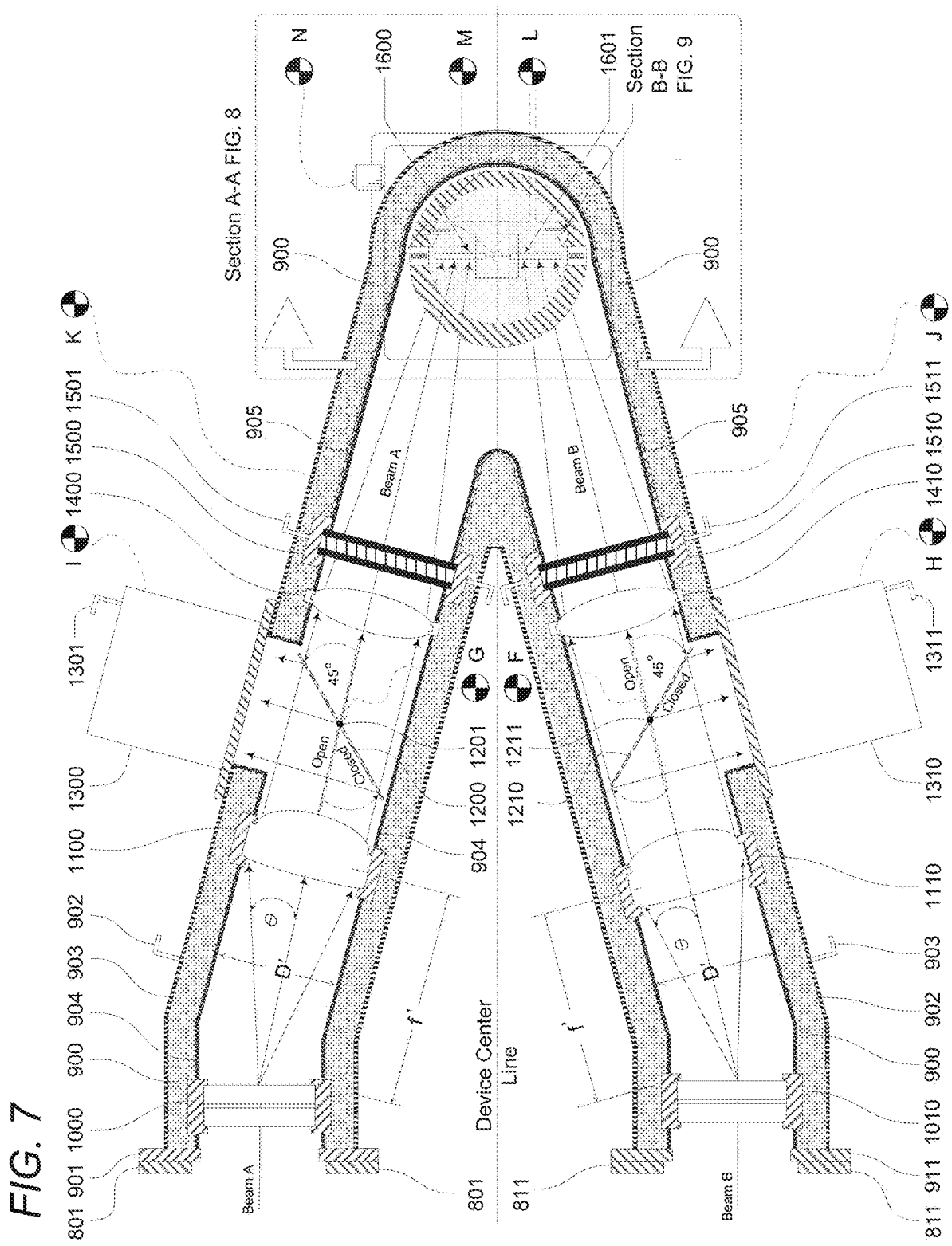
FIG. 7 shows components 900 through 1601 of an embodiment of a measurement device according to the present invention.
Figure 8:
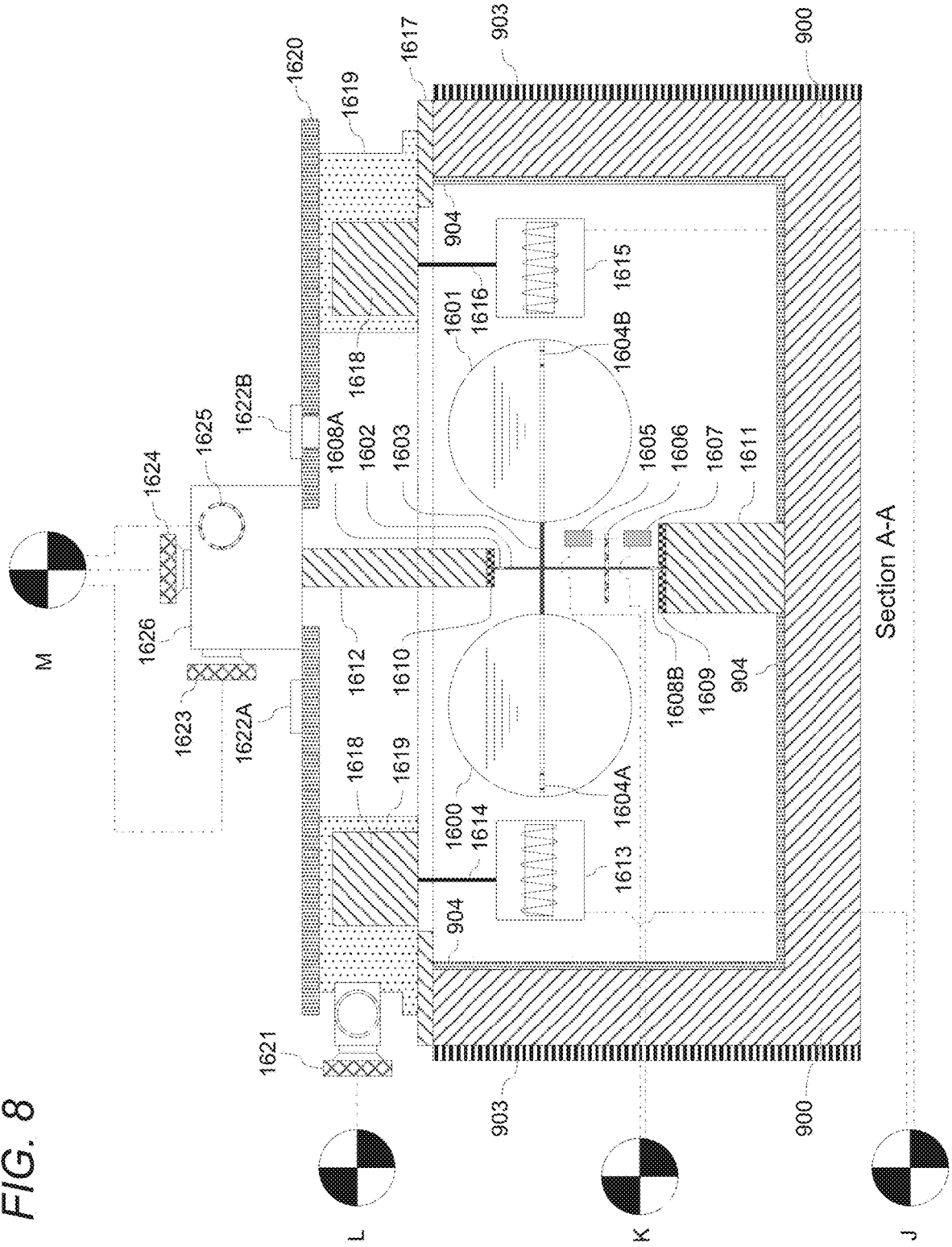
FIG. 8 shows Section A-A components 1600 through 1626 of an embodiment of a measurement device according to the present invention.

FIG. 7 water or liquid nitrogen cooled conduit 900 provides a light tight optical cavity and stable heat sink conduction mounting for beam steering prism 1000, 1010, collimator lens 1100, 1110, radiant flux sensor 1300, 1310, beam positioning mirrors 1200, 1210, focus lens 1400, 1410, energy choppers 1500, 1510 components, as well as the equal-arm force comparator device detailed in FIGS. 8 and 9. All optical components are securely mounted within water cooled equal-arm force comparator conduit 900 providing a solid heat conduction path to stand-off connector water or liquid nitrogen cooling jacket 903 that is adequately chilled through water or liquid nitrogen cooling source connectors 902, to dissipate exposure from source 100 electromagnetic energy. The technical specifications for conduit 900 are the same as conduit 300 described in FIG. 5. Universal flange 901 and 911 shall be machined with numerous mounting holes to accept monochromator connecting flanges 801 and 811. Heat sink functionality is preferably provided to conduit 900 conduction mounted optical components through the chilled water or liquid nitrogen cooling jacket 903 through connectors 902. The interior of equal-arm force comparator conduit 900 preferably has the same stray light specifications cited within FIG. 5. Water cooled stand-off connector 900 interior shall preferably be coated with high energy absorbing materials 904 that are the same as or equal to 304 energy absorbing materials cited in FIG. 5. Under the energy absorbing materials 904, within the area of conduit 900 between heat load choppers 1500 and 1510 and the area surrounding the equal-arm force comparator targets 1600 and 1610, there is a second coating of gold Nanotriangles, Nanohexagons, Nanopolygons and Nanorods (AuNP) or other type of materials 905 that are highly efficient at absorbing impinging electrons that may be emitted from target 1600 and 1601. 905 materials are equal or superior to electron absorbing coatings manufactured by Strem Chemicals, Inc., FIG. 10. Beam steering wedge prisms 1000 and 1010 deflect, by refraction, the centerline of the electromagnetic energy beam received from monochromators 800 and 810, steering Beam A and Beam B to center of equal-arm force comparator targets 1600 and 1610 respectively through collimator lenses 1100 and 1110 and focusing lenses 1400 and 1410. Beam steering wedge prism lenses 1000 and 1010 provide an aperture size optimized for maximum output of monochromatic electromagnetic energy received from monochromators 800 and 810 and shall be manufactured of optical lens materials equal or superior to high-quality polycrystalline CVD (chemical vapor deposition) diamond materials detailed in FIG. 11 and are equal or superior to beam steering prisms manufactured by OPTRA, Inc., FIG. 10. The focal length (f') from beam steering wedge prism lenses 1000 and 1010 to collimator lenses 1100 & 1110 shall preferably be as short a distance as practical to optimize the collection of electromagnetic energy. The diameter (D') of collimator lenses 1100 & 1110 shall pass as much electromagnetic energy as is practical to target lenses 1400 & 1410. The F-number (F) is approximately a function of $F=f'/D'$ and $\theta$ equals the half angle of the cone of radiation consistent with these variables as described in FIG. 5. Positioning mirrors 1200 and 1210 are capable of being rotated about positioning axis 1201 and 1211 respectively at two settings; 45° to center line of electromagnetic energy emitted from collimators 1100 and 1110, or in-line (parallel) to the center line of electromagnetic energy emitted from collimators 1100 and 1110. Positioning axis mechanism 1201 and 1211 for positioning mirrors 1200 and 1210 may be connected through standard network connectors F and G to PLC controller component 1800 that programmatically sets the position of the mirror, described in FIG. 2. When positioning mirrors 1200 & 1210 are set at 45° (or closed position) to collimated Beam A and Beam B radiant energy they reflect as close to 100% of impinging monochromatic radiant energy as practical, to radiant energy sensors 1300 and 1310. Radiant energy is reflected into radiant energy sensors 1300 and 1310 for a long enough time to acquire a spectral radiant energy reading without damage, which is measured in units of $W \cdot sr^{-1} \cdot m^{-2} \cdot nm^{-1}$ for $B_\lambda(T)$ where W is Watts, $sr^{-1}$ is steradian, $m^{-2}$ is square meter and nm is nanometer wavelength. When mirrors 1200 and 1210 are positioned parallel (or open position) to center line of Beam A and Beam B, radiant energy emitted from collimator lenses 1100 & 1110 through target lenses 1400 and 1410 shall be kept to within 3 degrees of orthogonal with minimal loss of radiant energy. Positioning mirrors 1200 and 1210 are equal or superior to Präzisions Glas & Optik high temperature mirrors detailed within FIG. 10. Radiant energy or spectral radiance sensors 1300 and 1310 are preferably equal or superior to MIKRON M350 Heat Flux Meters, as detailed within FIG. 10. These sensors are capable of measuring radiant energy up to or exceeding 200 KW/m2 at temperatures up to or exceeding 1100° C. and are cooled through water or liquid nitrogen connectors 1301 and 1311. PLC connector H and I enable high accuracy reading of radiant energy and instrument control. Conduction mounted focusing lenses 1400 and 1410 direct Beam A and Beam B radiant energy from collimator 1100 and 1110 within equal-arm force comparator targets 1600 and 1610. Focusing lenses 1400 and 1410 shall preferably be manufactured of materials equal or superior to high-quality polycrystalline CVD (chemical vapor deposition) diamond materials that exhibit excellent optical, thermal and mechanical properties. The physical property of focusing lenses 1400 and 1410 are defined in FIG. 11 and are equal or superior to lenses manufactured by Element 6 and II-VI Infrared, as detailed within FIG. 10.

Heat load choppers 1500 and 1510 preferably operate in fully open or fully closed position and are securely mounted within liquid cooled equal-arm force comparator conduit 900 providing a solid heat conduction path to stand-off connector water or liquid nitrogen cooling jacket 903. Additionally, heat load choppers 1500 and 1510 are cooled through water or liquid nitrogen connectors 1501 and 1511 enabling them to operate in closed position long enough to obtain a measurement of absorbed energy-momentum symmetry. In closed position the radiant energy from Beam A and/or Beam B is stopped or prevented from impinging equal-arm force comparator targets 1600 and 1610. In open position, the radiant energy from Beam A and/or Beam B is allowed to pass, impinging equal-arm force comparator targets 1600 and/or 1610. Heat load choppers 1500 and 1510 are equal or superior to stepper-motor driven electromagnetic choppers manufactured by Sutter Instruments Company or McPherson vacuum compatible optical accessories detailed within FIG. 10. The operational sequence of heat load choppers 1500 and 1510 are controlled by PLC 1800 through connectors J and K. The operational sequence of heat load choppers 1500 and 1510 are defined within measurement regimes of FIG. 2. The equal-arm force comparator device is preferably mounted within light-tight and water or liquid nitrogen cooled conduit 900, described in detail within FIG. 8 and FIG. 9.

FIG. 8 is Section A-A of conduit 900 containing vacuum-compatible precision rotating stage 1619, automatic or manual precision XYZ motion control translation system 1626, positioning electromagnets 1613, 1615, fixed light emitting diode 1605, opto-electric sensor 1607, encoder disk 1606 and an equal-arm force comparator as shown in FIG. 9. Conduit 900 water or liquid nitrogen cooling jacket 903 and energy absorbing coatings conduit materials 904 are a continuation of these components described in detail within FIG. 7. Those segments of the preferred embodiment of the equal-arm force comparator shown in FIG. 8 include radiant energy impinging targets 1600 and 1601, vertical fixed symmetry axis 1602, horizontal target equal-arm 1603 with magnetic end-caps 1604A and 1604B, light emitting diode 1605, high density encoder disk 1606, optical sensor 1607, fixed symmetry axis stylus 1608A and 1608B, stylus mount base plate 1609 and 1610 mounted to spacing column 1611 and XYZ adjusting column 1612 respectively. FIG. 9 provides additional detailed information regarding the equal-arm force comparator device components. The primary positioning and operating control mechanisms are a vacuum-compatible precision rotating stage 1619 and precision XYZ motion control translation system 1626 preferably similar or equal to piezo nano positioning vacuum compatible rotating stage devices and XYZ precision nano-positioning systems manufactured by Physik Instrumente (PI) detailed in FIG. 10 respectively. The rotating stage 1619 component position targets 1600 and 1601 into measurement ready alignment using electromagnetics 1613 and 1615 that are secured to the continuous 360 degree rotating stage 1618 by brackets 1614 and 1616. Measurement ready alignment is defined in FIG. 9. Automatic or manual precision XYZ motion control translation system 1626 positions vertical fixed symmetry axis 1602 of the equal-arm force comparator enabling it to rotate with the least practical wobble and coefficient of friction practical. Adapter mounting plate 1617 secures vacuum-compatible precision rotating stage 1619 to conduit 900 maintaining less than 1 Torr vacuum level. Adapter mounting plate 1620 secures and mounts precision XYZ motion control translation system 1626 to precision rotating stage 1619 in an air tight manner maintaining less than 1 Torr vacuum level within conduit 900. Component 1622A and 1622B are access ports enabling access to target mechanism FIG. 9. Rotating stage 1619 is comprised of a 360° continuous rotating stage 1618 with a preloaded worm drive, or equivalent, for zero backlash manual or automatic stage 1619 rotation actuator 1621. Electromagnets 1613 and 1615 are securely fastened to rotating stage 1618 enabling targets 1600 and 1601 to be secured in measurement ready position, as defined in FIG. 9. Input/Output (I/O) connectors J, K, L, and M are connected to Logic Controller PLC 1800 as detailed in FIG. 9. These I/O connectors enable a preferred equal-arm force comparator device to be configured and optimized for radiant momentum measurement. I/O connector J preferably enables PLC 1800 to turn electromagnets 1613 and 1615 on and off. I/O K is connected to light emitting diode 1605 and optical sensor 1607 which enable PLC 1800 to determine the position, velocity and acceleration of targets 1600 and 1601. I/O L enables PLC 1800 to actuate rotating stage 1618 through actuator 1621 to position electromagnets 1613 and 1615 (actuated by I/O J) as needed to both position targets 1600 and 1601 and to dampen their rotation after measurement is conducted. I/O M enables PLC 1800 to position X-axis motion control 1623, Y-axis motion control 1624, and Z-axis motion control 1625 to set vertical fixed symmetry axis 1602 as perfectly as practical within conduit 900. Details of the equal-arm force comparator components and operation are set forth herein in FIG. 2 and FIG. 9.

FIG. 9 further shows additional details of mechanical component, Section B-B and Section C-C, of the equal-arm force comparator device that operates within the high vacuum environment, less than 1 Torr vacuum level within conduit 900. These components measure absorbed radiant momentum in the manner of an equal-arm mass comparator by comparing the force of one beam of known radiant energy, Beam A, impinging target 1600 against the force of a second beam of known radiant energy, Beam B, or no beam, impinging target 1601 attached to the opposing end of the horizontal equal-arm 1603 utilizing measurement regimes defined in FIG. 2. Measurement of radiant momentum is a function of the maximum rotational velocity (V) of the known mass (m) of the rotational components of the invention's equal-arm force comparator in accord with Newton's Laws of Motion as described in FIG. 2. The rotating components of the equal-arm force comparator device, 1600, 1601, 1602, 1603, 1604A, 1604B, 1606, 1608A, 1608B, 1627A, 1627B and 1628 shall be manufactured of the lowest practical mass and the highest practical Young's modulus, or stiffness, similar to functionally engineered nanocomposite substrate materials manufactured by Materion Microelectronics & Services, FIG. 10. Circular targets 1600 and 1601 operate in a similar manner to solar sails U.S. Pat. No. 7,913,953 B2, the disclosures of which are incorporated by reference, and shall be as large as necessary to cause the rotating components of the equal-arm force comparator to rotate with sufficient velocity to acquire an accurate measurement of radiant momentum when impinged by source 100 radiant energy. Target substrate materials 1627A and 1627B shall be manufactured with the least practical mass, highest practical Young's modulus, or stiffness and high temperature resistance that provide the best practical substrate for crystal lattice photovoltaic material 1600 and 1601. Substrate materials 1627A and 1627B shall be similar to functionally engineered nanocomposite substrate materials manufactured by Materion Microelectronics & Services as referenced in FIG. 10.

Radiant energy impinged thin film crystal lattice photovoltaic materials 1600 and 1601 deposited on target substrate materials 1627A and 1627B shall be manufactured of the lowest practical mass and highest practical temperature resistant materials yielding the greatest practical efficiency and performance for impinging radiant energy measured. Efficiency and performance of crystal lattice photovoltaic materials 1600 and 1601 are a function of the materials ability to absorb impinging radiant energy as described by Einstein as a $E_k = h\nu - \phi$, where h equals Planck's constant expressed as the energy of one quantum of radiant energy equaling $(6.63 \times 10^{-34}$ J s), $\nu$ equals frequency (Hz) and $\phi$ equals work function expressed as the minimum energy required to remove an electron from the surface of a given crystal lattice photovoltaic material in joules (J) and $E_k$ equals the maximum kinetic energy of the emitted electron in joules (J). Crystal lattice photovoltaic materials 1600 and 1601, in addition to having the lowest practical mass, shall also have the highest practical emitted electron kinetic energy ($E_k$) and the lowest practical work function ($\phi$) when impinged by the lowest possible frequency above threshold frequency. Threshold frequency is defined as the minimum frequency of radiation that will produce a photoelectric effect. 1600 and 1601 target materials shall be capable of absorbing impinging radiant energy for a sufficient period of time to cause rotational velocity of the rotating components of the equal-arm force comparator, defined above, without being thermally damaged. Target materials 1600 and 1601 shall be similar to functionally engineered photovoltaic materials manufactured by Materion Microelectronics & Services as referenced in FIG. 10.

Horizontal equal-arm target support 1603 is attached perfectly perpendicular to fixed symmetry axial shaft 1602 by connector 1628. The distance from the centerline of fixed symmetry axial shaft 1602 to the center of attached equal diameter targets 1600 and 1601 are equal (distance A=distance B). Additionally, the diameter of target 1601 (Dia. X) is equal to the diameter of target 1600 (Dia. Z). The diameter of targets 1600 and 1601 shall be large enough to rotate the rotating components of the equal-arm force comparator, as defined herein, when impinged by the force of Beam A or Beam B. Opposing ends of fixed symmetry axial shaft 1602 are stylus mounts 1608A and 1608B. The low friction mounting mechanism formed between bearing stylus ends 1608A and 1608B and bearing pads 1609 and 1610 shall enable the equal-arm force comparator to rotate with as little wobble and coefficient of friction as practical. The ends of fixed symmetry axial shaft 1602 are coated with the smallest mass of low friction diamond bearing materials practical while maintaining performance requirements. The low friction bearing stylus 1608A, 1608B of fixed symmetry axial shaft 1602 and bearing pads 1609, 1611 materials of construction are similar to the family of low friction diamond bearing materials manufactured by Advanced Diamond Technologies, as detailed in FIG. 10.

Magnetic caps 1604A and 1604B of the opposing ends of horizontal equal-arm 1603 are coated with an equal mass of materials having magnetic properties. These materials enable electromagnets 1613 and 1615 to both rotate targets 1600 and 1601 into measurement ready position and to dampen rotation after measurement. FIG. 2 defines the operational process of actuating electromagnets 1613 and 1615 to perform this function. Measurement ready is defined as targets 1600 and 1601 aligned so that the angle $\theta^A$ is equal to the angle $\theta^B$. Angle $\theta^A$ is defined as the angle between target 1600 and impinging Beam A. Angle $\theta^B$ is defined as the angle between target 1601 and impinging Beam B. Magnetic cap 1604A and 1604B materials are similar or equal to ultra-light magnetic materials manufactured of silica aerogel combined with extremely fine magnetic particles composed of neodymium, iron and boron as developed by the Physics Department at the Universitat Autonoma de Barcelona (UAB), the Institut de Ciència de Materials de Barcelona ICMAB CSIC and the Universidad de Zaragoza, FIG. 10.

The maximum rotational velocity of the rotating components of the equal-arm force comparator device is measured using a frictionless measurement device similar to prior art U.S. Pat. No. 4,445,087 the disclosures of which are incorporated by reference. More specifically, the maximum rotational velocity of the rotating components of the invention's equal-arm force comparator is derived by a fixed light emitting diode 1605, either a LED or laser diode that does not rotate with the fixed symmetry axial shaft 1602, and perpendicularly mounted encoder disk 1606. Fixed light emitting diode 1605 passes light through high density scaled encoder disk 1606 having a series of high density light-impermeable and light-permeable marks to opto-electric sensor 1607 that passes the modulated signal to PLC 1800 through connector K. PLC 1800 translates the modulated signal from opto-electric sensor 1607 to a readable output of the location position of the equal-arm force comparator components and their rotational velocity and momentum using the rotational equivalent of Newton's linear momentum or $L = \Sigma r \cdot mV$ as herein described.

FIG. 10 is a list of all prior art component manufacturers for items disclosed in this preferred embodiment, in table form.

FIG. 11 contains the technical specifications for all optical lenses for use in the preferred embodiments disclosed herein in table form.

It will be appreciated by the person of ordinary skill in the art that the foregoing description of a preferred embodiment is not limiting in that the invention may be accomplished in many different devices and methods. Thus, while the invention has been described with reference to a preferred embodiment as explained herein, the person or skill in the art will appreciate that changes in form and details may be made without departing from the spirit and scope of the invention as ultimately defined by the claims.

The invention claimed is:

1. A method for measuring absorbed energy-momentum symmetry, comprising:
    splitting a single source of high intensity radiant energy into a first beam of energy and a second beam of energy, each beam being filtered to a desired monochromatic wavelength;
    conducting a first measurement of radiant energy of both beams at a first measuring point, said measurement being performed in units of watts per steradian per square meter per nanometer ($W \cdot sr^{-1} \cdot m^{-2} \cdot nm^{-1}$);
    providing an equal-arm force comparator device capable of engaging said two beams of energy, and rotating about a point, said comparator device including two targets to engage said two beams of energy such that said first beam impinges against a first target and said second beam impinges against a second target, said first and second beams having a known wavelength and radiant energy, and further said beams impinging against said targets at the same angle of incidence at the same moment and direction in time;
    conducting a second measurement of any resultant angular velocity of said targets included on said comparator device at a second measuring point to provide a measurement of the radiant energy's impinging momentum;
    determining an electrical output of the measured angular velocity as conducted as the second measuring point;
    providing a programmable logic controller including an input device;
    inputting an electrical output into said programmable logic controller, said input corresponding to the measured angular velocity as determined at the second measuring point and yielding a radiant momentum (p) value in the units of kg·m·s-1; and
    determining a ratio of said first measurement of radiant energy relative said second measurement of the radiant energy's impinging momentum, to thereby yield a measurement of absorbed energy-momentum symmetry.

2. The method of claim 1 further comprising determining a derived radiant energy as a function of momentum as measured by multiplying the radiant momentum (p) by the speed of light (c) in a vacuum at a specific wavelength or frequency.

3. The method of claim 2 further comprising providing at least one electromagnetic energy measurement device for measuring radiant energy in a manner consistent with Planck's Law in units of $W \cdot sr^{-1} \cdot m^{-2} \cdot nm^{-1}$ where "W" is Watts, "$sr^{-1}$" is steradian, "$m^{-2}$" is meters squared and "nm" is wavelength.

4. The method of claim 3 further comprising the step of providing at least one electromagnetic energy measurement device for measuring radiant energy further comprises calibrating said electromagnetic energy devices calibrated to yield a derived radiant energy that is inconsistent with Planck's Law.

5. The method according to claim 1 further comprising providing a device for detecting the radiant power of electromagnetic energy at a known temperature and monochromatic frequency that calibrated to yield an absorbed radiant momentum ($p_c$) measurement associated with the radiant energy measurement, at a known source temperature and frequency.

6. The method according to claim 5, further comprising deriving a radiant energy ($E_d$) as a function of measured radiant momentum ($E_d = (p_c) \times (c)$).

7. A comparator for measuring absorbed energy-momentum symmetry, comprising
- a high intensity energy source capable of emitting a beam of radiant energy;
- a pair or radiant energy targets attached to opposing arms of a balanced horizontal arm that is able to rotate in a substantially frictionless manner about a point;
- a device for splitting said beam of radiant energy such that a first split portion of said beam impinges against the first radiant energy target of said pair of targets, and a second split portion of said beam impinges against the second radiant energy target of said pair of targets; and
- a measurement device for measuring the momentum caused by one or both of said split portions of said radiant energy beam impinging at least one of said pair of targets, whereby the comparator measures radiant energy in units of $W \cdot sr^{-1} \cdot m^{-2} \cdot Hz^{-1}$ directly against its impinging momentum in units of $kg \cdot m \cdot s^{-1}$.

8. The comparator of claim 7, wherein said measurement device measures absorbed radiant energy or derived radiant energy in units of $W \cdot m^{-2} \cdot Hz^{-1}$.

9. The method of claim 1 wherein said targets are made of a materials that provides the smallest practical mass that generates the highest practical liberated electron kinetic energy from the lowest practical impinging electromagnetic frequency above a threshold frequency.

10. A method for measuring absorbed energy-momentum symmetry, comprising:
- providing a source of high intensity radiant energy and an equal-arm force comparator device having at least one energy absorbing target;
- measuring a first parameter radiant energy measurement of said high intensity radiant energy in units of watts per steradian per square-meter per nanometer ($W \cdot sr^{-1} \cdot m^{-2} \cdot nm^{-1}$) at a first measuring point;
- directing said high intensity radiant energy as measured at said first measuring point to a second measuring point, such that said source provides at least one beam of known wavelength and radiant energy that impinges at least one energy absorbing target of said equal-arm force comparator at an angle of incidence and an instant and duration of time, thereby causing rotation or angular velocity of the comparator;
- measuring a second parameter measurement of the resultant angular velocity of the rotating component of the equal-arm force comparator at said second measuring point with an apparatus for measuring the angular velocity of a rotating member;
- measuring an electrical output of the measured angular velocity from the second measuring point;
- inputting said measured electrical output into a programmable logic controller (PLC) to yield a radiant momentum (p) in units of $kg \cdot m \cdot s^{-1}$ from the known mass and the angular velocity of the rotating components of the equal-arm force comparator in accord with Newton's laws of motion;
- recording said first and second parameter measurements in the PLC;
- outputting as a ratio of the first parameter measurement of radiant energy at chosen wavelength directly against the second parameter measurement of the radiant energy's impinging momentum, yielding measurement of absorbed energy-momentum symmetry; and
- calculating a derived radiant energy ($E_d$) at a specific wavelength or frequency as a function of momentum measured by said comparator device (p)×(c) where (c) is the speed of light in a vacuum.

* * * * *

UNITED STATES PATENT AND TRADEMARK OFFICE
CERTIFICATE OF CORRECTION

PATENT NO. : 10,690,542 B2
APPLICATION NO. : 16/011022
DATED : June 23, 2020
INVENTOR(S) : Steve W. Fleck Page 1 of 1

It is certified that error appears in the above-identified patent and that said Letters Patent is hereby corrected as shown below:

In the Claims

Claim 7, Lines 17-19 should read:
...whereby the comparator measures radiant energy in units of $W \cdot sr^{-1} \cdot m^{-2} \cdot Hz^{-1}$ directly against its impinging momentum in units of $kg \cdot m \cdot s^{-1}$.

Signed and Sealed this
Fifth Day of January, 2021

Andrei Iancu
*Director of the United States Patent and Trademark Office*